United States Patent
Ono et al.

(10) Patent No.: US 6,727,303 B2
(45) Date of Patent: Apr. 27, 2004

(54) FLAME RETARDANT AROMATIC POLYCARBONATE RESIN COMPOSITION AND MOLDED ARTICLES THEREOF

(75) Inventors: Tetsushi Ono, Tokyo (JP); Akinari Itagaki, Tokyo (JP); Masaaki Yamaya, Tokyo (JP); Yoshiteru Kobayashi, Gunma (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/229,221

(22) Filed: Aug. 28, 2002

(65) Prior Publication Data

US 2003/0158309 A1 Aug. 21, 2003

(30) Foreign Application Priority Data

| Aug. 30, 2001 | (JP) | 2001-261267 |
| Aug. 30, 2001 | (JP) | 2001-261268 |
| Aug. 30, 2001 | (JP) | 2001-261269 |
| Jan. 21, 2002 | (JP) | 2002-012092 |
| Jan. 21, 2002 | (JP) | 2002-012093 |
| Jan. 21, 2002 | (JP) | 2002-012094 |

(51) Int. Cl.$^7$ ............................. C08K 5/24; C08K 5/54
(52) U.S. Cl. .................. 524/261; 524/263; 524/267; 524/155; 524/156; 524/166
(58) Field of Search ............................. 514/261, 263, 514/267, 155, 156, 166

(56) References Cited

U.S. PATENT DOCUMENTS

| 3,971,756 A | 7/1976 | Bialous et al. |
| 4,110,299 A | 8/1978 | Mark |
| 4,221,728 A | 9/1980 | Jaquiss et al. |
| 4,358,556 A | 11/1982 | van Abeelen |
| 5,326,803 A | 7/1994 | Avakian et al. |
| 5,668,204 A | 9/1997 | Meier et al. |

FOREIGN PATENT DOCUMENTS

| EP | 0-600196 A1 | 6/1994 |
| EP | 0-0933387 A1 | 8/1999 |
| EP | 1 167 448 | 1/2002 |
| JP | 60-38419 | 8/1985 |
| JP | 1-247456 | 10/1989 |
| JP | 2-238046 | 9/1990 |
| JP | 4-202476 | 7/1992 |
| JP | 6-306265 | 11/1994 |
| JP | 6-336547 | 12/1994 |
| JP | 9-169914 | 6/1997 |
| JP | 9-239937 | 9/1997 |
| JP | 10-139964 | 5/1998 |
| JP | 11-217494 | 8/1999 |
| JP | 2000-109668 | 4/2000 |
| JP | 2000159995 | 6/2000 |
| JP | 2000-297209 | 10/2000 |
| JP | 2000-297214 | 10/2000 |
| JP | 2000-327781 | 11/2000 |
| JP | 2001-031771 | 2/2001 |
| JP | 2001139790 | 5/2001 |
| JP | 2001200164 | 7/2001 |
| JP | 2001-270983 | 10/2001 |
| JP | 2002-037997 | 2/2002 |
| JP | 2002-037998 | 2/2002 |
| JP | 2002-037999 | 2/2002 |
| JP | 2002-047428 | 2/2002 |
| JP | 2002-060612 | 2/2002 |
| JP | 2002-105284 | 4/2002 |
| WO | WO 02/057369 | 7/2002 |

*Primary Examiner*—Kriellion A. Sanders
(74) *Attorney, Agent, or Firm*—Wenderoth, lind&Ponack,LLP

(57) ABSTRACT

A flame retardant aromatic polycarbonate resin composition comprising:

(1) 100 parts by weight of resin components comprising 50 to 100 wt % of an aromatic polycarbonate resin (component A-1), 0 to 50 wt % of a styrene-based resin (component A-2) and 0 to 50 wt % of an aromatic polyester resin (component A-3); and (2) 0.1 to 10 parts by weight of a silicone compound (component B) which contains an Si—H group and an aromatic group in the molecule based on 100 parts by weight of the total of the resin components, wherein the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

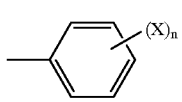

(1)

wherein X's are each independently an OH group or the residual monovalent organic group having 1 to 20 carbon atoms, and n is 0 or an integer of 1 to 5, with the proviso that when n is 2 or more, X's can differ from one another, and molded articles thereof.

A halogen-free polycarbonate resin composition having excellent transparency and dripping preventing properties and molded articles thereof are provided according to the present invention.

26 Claims, No Drawings

FLAME RETARDANT AROMATIC POLYCARBONATE RESIN COMPOSITION AND MOLDED ARTICLES THEREOF

FIELD OF THE INVENTION

The present invention relates to a flame retardant aromatic polycarbonate resin composition and molded articles thereof. More specifically, it relates to a flame retardant aromatic polycarbonate resin composition which comprises substantially no bromine compound or chlorine compound (halogen-based flame retardant), or no phosphorus compound as a flame retardant and has excellent dripping preventing properties and to molded articles thereof. The present invention further relates to a flame retardant aromatic polycarbonate resin composition which provides molded articles having excellent transparency.

DESCRIPTION OF THE PRIOR ART

Aromatic polycarbonate resins and aromatic polycarbonate-based resins such as aromatic polycarbonate resin/styrene-based resin alloys and aromatic polycarbonate resin/aromatic polyester resin alloys are formed into various molded articles by a processing method which is simple and has excellent productivity, such as injection molding, and used in a wide variety of industrial fields. More specifically, aromatic polycarbonate resins and alloys thereof are used in exterior and interior parts for OA equipment and home electric appliances such as personal computers, notebook personal computers, laser beam printers, ink jet printers, copiers and facsimiles. In these application fields, great importance may be attached to the dyeing properties of a resin composition when it is mixed with a colorant, which are reflected on the gloss, color, clarity, uniformity and the like of a molded article. Also importance may be attached to the clarity of a character or mark printed by laser marking as a high-speed simple method for marking a desired character, symbol or pattern on the surface of a molded article at a high reproducibility.

Meanwhile, aromatic polycarbonate resin molded articles are used in a wide variety of industrial fields which require excellent transparency and heat resistance. Especially in application fields which require high transparency, such as lighting covers and protective covers for transmission type displays, they are widely used, making use of the excellent transparency, that is, high light transmission and extremely low haze of aromatic polycarbonate resins. In these application fields, resin materials are required to retain transparency, color and mechanical properties even when they are exposed to heat and humidity because a light source such as a fluorescent light or electric bulb becomes very hot or a product obtained therefrom is exposed to high humidity when it is used in a bath room or outside. Therefore, there is a case where great importance is attached to the resistance to moist heat of a resin composition, in addition to transparency.

In the above application fields, flame retardancy at the time of a fire has been attracting much attention and a resin composition having high flame retardancy in addition to the above characteristic properties is now desired. As means of providing flame retardancy to an aromatic polycarbonate resin or alloy thereof, flame retardant aromatic polycarbonate resin compositions which comprise a halogen compound such as a bromine compound or chlorine compound, or phosphorus compound as a flame retardant have been proposed and used in OA equipment and home electric appliances which are strongly desired to be flame retardant. Meanwhile, new flame retardant aromatic polycarbonate resin compositions have been developed as substitutes for the above resin compositions and are now being used in the above products. The purpose of changing the flame retardant is to suppress the generation of corrosive gas at the time of molding or improve the recyclability of products.

Flame retardants which are substitutes for the above flame retardant include a silicone compound. A flame retardant resin composition obtained by mixing a silicone compound with an aromatic polycarbonate resin has been studied vigorously and various proposals have been made.

For example, a method of mixing an alkali (earth) metal salt of perfluoroalkanesulfonic acid and an organic siloxane having an alkoxy group, vinyl group and phenyl group with a polycarbonate resin (JP-A 6-306265) (the term "JP-A" as used herein means an "unexamined published Japanese patent application") and a method of mixing an alkali metal salt or alkali earth metal salt of perfluoroalkanesulfonic acid and an organopolysiloxane having an organoxysilyl group of which a silicon atom bonds to a divalent hydrocarbon group with a polycarbonate resin (JP-A 6-336547) have been proposed.

A method of mixing a specific petroleum-based heavy oil or pitch and a silicone compound with a resin component (JP-A 9-169914) and a method of mixing a silicone resin comprising a unit represented by $R_2SiO_{1.0}$ and a unit represented by $RSiO_{1.5}$ and having a weight average molecular weight of 10,000 to 270,000 with a non-silicone resin having an aromatic ring (JP-A 10-139964) have also been proposed.

However, it cannot be said that the above proposed polycarbonate resin compositions are satisfactory in terms of transparency, resistance to moist heat and flame retardancy. For instance, when a molded article of the polycarbonate resin composition is thin, the UL 94 V-0 rank cannot be achieved due to the occurrence of dripping, a molded article thereof becomes cloudy due to the unsatisfactory dispersion of silicone, or transparency lowers after a moist heat treatment because silicone is agglomerated by the moist heat treatment.

Meanwhile, JP-B 60-38419 (the term "JP-B" as used herein means an "examined Japanese patent publication") discloses a resin composition which comprises an aromatic polycarbonate resin, an organic alkali metal salt and poly (methyl hydrogensiloxane). However, it cannot be said that the resin composition is satisfactory in dyeing properties when it is mixed with a colorant, which are reflected on the gloss, color, clarity, uniformity and the like of a molded article because the composition itself becomes cloudy and a dispersion failure such as peeling occurs on the surface of the molded article.

Further, polytetrafluoroethylene having fibril forming capability is often used as a dripping preventing agent. However, when polytetrafluoroethylene is mixed with an aromatic polycarbonate resin, the transparency of the obtained molded article lowers because polytetrafluoroethylene and the aromatic polycarbonate resin are incompatible with each other.

Problems to be Solved by the Invention

It is a first object of the present invention to provide a flame retardant aromatic polycarbonate resin composition which comprises substantially no halogen compound and also preferably no phosphorus compound as a flame retardant. More specifically, it is a flame retardant aromatic polycarbonate resin composition which is excellent in dyeing properties at the time of coloring, the clarity of a character or mark printed by laser marking, and resin dripping preventing properties at the time of combustion.

It is a second object of the present invention to provide a transparent flame retardant aromatic polycarbonate resin composition which has excellent transparency, resistance to moist heat and resin dripping preventing properties at the time of combustion.

It is a third object of the present invention to provide a flame retardant aromatic polycarbonate resin composition which has excellent tracking resistance, antistatic properties and resin dripping preventing properties at the time of combustion.

Means for Solving the Problems

The inventors of the present invention have conducted intensive studies to attain the above objects and have found that a flame retardant aromatic polycarbonate resin composition which is excellent in dyeing properties at the time of coloring, the clarity of a character or mark printed by laser marking and resin dripping preventing properties at the time of combustion and further a flame retardant aromatic polycarbonate resin composition which has excellent transparency and resistance to moist heat are obtained by mixing a predetermined amount of a specific silicone compound with an aromatic polycarbonate resin.

That is, according to the present invention, there is provided a flame retardant aromatic polycarbonate resin composition comprising:

(1) 100 parts by weight of resin components comprising 50 to 100 wt % of an aromatic polycarbonate resin (component A-1), 0 to 50 wt % of a styrene-based resin (component A-2) and 0 to 50 wt % of an aromatic polyester resin (component A-3); and (2) 0.1 to 10 parts by weight of a silicone compound (B) which contains an Si—H group and an aromatic group in the molecule based on 100 parts by weight of the total of the resin components, wherein
the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

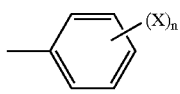

(1)

wherein X's are each independently an OH group or the residual monovalent organic group having 1 to 20 carbon atoms, and n is 0 or an integer of 1 to 5, with the proviso that when n is 2 or more, X's can differ from one another.

DETAILED DESCRIPTION OF THE PREFERRED EMBODIMENT

The flame retardant aromatic polycarbonate resin composition of the present invention will be described in detail hereinunder. A description is first given of resin components (components A) and a silicone compound (component B) as a frame retardant constituting the composition in the order named.

Out of the resin components (components A) in the resin composition, the aromatic polycarbonate resin used as the component A-1 is generally obtained by reacting a diphenol with a carbonate precursor in accordance with an interfacial polycondensation method or molten ester exchange method, by polymerizing a carbonate prepolymer in accordance with a solid-phase ester exchange method, or by polymerizing a cyclic carbonate compound in accordance with a ring-opening polymerization method.

Typical examples of the diphenol used herein include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (so-called bisphenol A), 2,2-bis{(4-hydroxy-3-methyl)phenyl}propane, 2,2-bis{(4-hydroxy-3,5-dimethyl)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. They may be used alone or in combination of two or more.

Out of these, a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, 9,9-bis{(4-hydroxy-3-methyl)phenyl}fluorene and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are particularly preferred.

The carbonate precursor is a carbonyl halide, carbonate ester, haloformate or the like, as exemplified by phosgene, diphenyl carbonate and dihaloformates of a diphenol. Out of these, phosgene and diphenyl carbonate are industrially advantageous.

To produce a polycarbonate resin by reacting the above diphenol with the above carbonate precursor in accordance with the interfacial polycondensation or molten ester exchange method, a catalyst, terminal capping agent, antioxidant for diphenols and the like may be used as required. The polycarbonate resin may be a branched polycarbonate resin obtained by copolymerizing a polyfunctional aromatic compound having a functionality of 3 or more, a polyester carbonate resin obtained by copolymerizing an aromatic or aliphatic (or alicyclic) dicarboxylic acid, copolycarbonate resin obtained by copolymerizing a bifunctional alcohol (including an alicyclic alcohol), polyester carbonate resin obtained by copolymerizing both of a dicarboxylic acid and a bifunctional alcohol, or a mixture of two or more of the obtained polycarbonate resins.

Illustrative examples of the polyfunctional aromatic compound having a functionality of 3 or more include phloroglucin, phloroglucide, trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When the polyfunctional compound forming a branched polycarbonate resin is contained, the amount of the polyfunctional compound is 0.001 to 1 mol %, preferably 0.005 to 0.9 mol %, particularly preferably 0.01 to 0.8 mol % based on the total amount of an aromatic polycarbonate. Although a branched structure may be formed as a side reaction in the case of the molten ester exchange method, the amount of the branched structure is 0.001 to 1 mol %, preferably 0.005 to 0.9 mol %, particularly preferably 0.01 to 0.8 mol % based on the total amount of an aromatic polycarbonate. The amount can be calculated by $^1$H-NMR measurement.

The reaction carried out by the interfacial polycondensation method is generally a reaction between a diphenol and phosgene in the presence of an acid binder and an organic solvent. Examples of the acid binder include alkali metal hydroxides such as sodium hydroxide and potassium hydroxide and amine compounds such as pyridine. Examples of the organic solvent include halogenated hydrocarbons such as methylene chloride and chlorobenzene. A catalyst such as a tertiary amine, quaternary ammonium compound or quaternary phosphonium compound exemplified by triethylamine, tetra-n-butylammonium bromide and tetra-n-butylphosphonium bromide may be used to promote the reaction. The reaction temperature is generally 0 to 40° C., the reaction time is about 10 minutes to 5 hours, and pH during the reaction is preferably maintained at 9 or more.

A terminal capping agent is generally used in the above interfacial polycondensation reaction. A monofunctional phenol may be used as the terminal capping agent. The monofunctional phenol which is generally used as the terminal capping agent to adjust molecular weight is a phenol or lower alkyl-substituted phenol such as a monofunctional phenol represented by the following general formula (5):

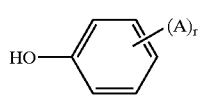

(5)

wherein A is a hydrogen atom, linear or branched alkyl group having 1 to 9 carbon atoms or phenyl group-substituted alkyl group, and r is an integer of 1 to 5, preferably 1 to 3.

Examples of the above monofunctional phenol include phenol, p-tert-butylphenol, p-cumylphenol and isooctylphenol.

Other monofunctional phenols include phenols and benzoic acid chlorides having a long-chain alkyl group or aliphatic polyester group as a substituent, and long-chain alkyl carboxylic acid chlorides. Out of these, phenols having a long-chain alkyl group as a substituent represented by the following general formulas (6) and (7) are preferred:

(6)

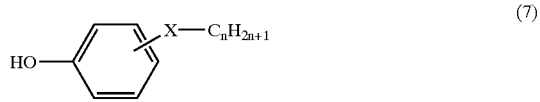

(7)

wherein X is —R—CO—O— or —R—O—CO— (R is a single bond or divalent aliphatic hydrocarbon group having 1 to 10 carbon atoms, preferably 1 to 5 carbon atoms), and n is an integer of 10 to 50.

The substituted phenol of the general formula (6) is preferably a phenol in which n is an integer of preferably 10 to 30, particularly preferably 10 to 26, as exemplified by decyl phenol, dodecyl phenol, tetradecyl phenol, hexadecyl phenol, octadecyl phenol, eicosyl phenol, docosyl phenol and triacontyl phenol.

The substituted phenol of the general formula (7) is preferably a compound in which X is —R—CO—O— (R is a single bond) and n is an integer of 10 to 30, particularly 10 to 26, as exemplified by decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate. The terminal capping agents may be used alone or in combination of two or more.

The reaction carried out by the molten ester exchange method is generally an ester exchange reaction between a diphenol and a carbonate ester which is carried out in the presence of an inert gas by mixing together the diphenol and the carbonate ester under heating and distilling out the formed alcohol or phenol. The reaction temperature, which changes according to the boiling point or the like of the formed alcohol or phenol, is generally 120 to 350° C. In the latter stage of the reaction, the pressure of the reaction system is reduced to $1.33 \times 10^3$ to 13.3 Pa to make it easy to distill out the formed alcohol or phenol. The reaction time is generally about 1 to 4 hours.

The carbonate ester is, for example, a carbonate ester having an aryl group or aralkyl group having 6 to 10 carbon atoms or alkyl group having 1 to 4 carbon atoms which may be substituted. Examples of the carbonate ester include diphenyl carbonate, bis(chlorophenyl)carbonate, dinaphthyl carbonate, bis(diphenyl)carbonate, dimethyl carbonate, diethyl carbonate and dibutyl carbonate. Out of these, diphenyl carbonate is preferred.

To accelerate the rate of polymerization, a polymerization catalyst may be used. Examples of the polymerization catalyst include alkali metal compounds such as sodium hydroxide, potassium hydroxide, and sodium salts and potassium salts of a diphenol, alkali earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of an alkali metal or alkali earth metal, organic acid salts of an alkali metal or alkali earth metal, zinc compounds, boron compounds, aluminum compounds, silicon compounds, germanium compounds, organotin compounds, lead compounds, osmium compounds, antimony compounds, manganese compounds, titanium compounds, and zirconium compounds, all of which are generally used for an esterification reaction or ester exchange reaction. These catalysts may be used alone or in combination of two or more. The amount of the polymerization catalyst is preferably $1\times10^{-8}$ to $1\times10^{-3}$ equivalent, more preferably $1\times10^{-7}$ to $5\times10^{-4}$ equivalent based on 1 mol of the diphenol as a raw material.

To reduce the number of phenolic terminal groups in the polymerization reaction, a compound such as bis(chlorophenyl)carbonate, bis(bromophenyl)carbonate, bis(nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate may be added in the latter stage of a polycondensation reaction or after the end of the polycondensation reaction. Out of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

A deactivator for neutralizing the activity of a catalyst is preferably used in the polymerization reaction. Illustrative examples of the deactivator include benzenesulfonic acid, p-toluenesulfonic acid, sulfonic acid esters such as methylbenzene sulfonate, ethylbenzene sulfonate, butylbenzene sulfonate, octylbenzene sulfonate, phenylbenzene sulfonate, methyl p-toluene sulfonate, ethyl p-toluene sulfonate, butyl p-toluene sulfonate, octyl p-toluene sulfonate and phenyl p-toluene sulfonate; and compounds such as trifluoromethanesulfonic acid, naphthalenesulfonic acid, sulfonated polystyrene, methyl acrylate-sulfonated styrene copolymer, 2-phenyl-2-propyl-dodecylbenzene sulfonate, 2-phenyl-2-butyl-dodecylbenzene sulfonate, tetrabutylphosphonium octylsulfonate, tetrabutylphosphonium decylsulfonate, tetrabutylphosphonium benzenesulfonate, tetraethylphosphonium dodecylbenzene sulfonate, tetrabutylphosphonium dodecylbenzene sulfonate, tetrahexylphosphonium dodecylbenzene sulfonate, tetraoctylphosphonium dodecylbenzene sulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzyl sulfate. The deactivator is not limited to these. These compounds may be used in combination of two or more.

Out of the deactivators, phosphonium and ammonium salt deactivators are particularly preferred. The deactivator is used in an amount of preferably 0.5 to 50 mols based on 1 mol of the residual catalyst, or preferably 0.01 to 500 ppm, more preferably 0.01 to 300 ppm, particularly preferably 0.01 to 100 ppm based on the polycarbonate resin after polymerization.

The molecular weight of the polycarbonate resin is not particularly limited. However, when the viscosity average molecular weight of the polycarbonate resin is smaller than 10,000, its high-temperature characteristic properties deteriorate and when the viscosity average molecular weight is larger than 50,000, its moldability lowers. Therefore, the viscosity average molecular weight is preferably 10,000 to 50,000, more preferably 14,000 to 30,000, much more preferably 14,000 to 24,000. Two or more of the polycarbonate resins may be mixed together. In this case, it is naturally possible to mix a polycarbonate resin having a viscosity average molecular weight outside the above range.

A mixture with a polycarbonate resin having a viscosity average molecular weight of more than 50,000 is preferred because it has high dripping preventing capability and exhibits the effect of the present invention efficiently. A mixture with a polycarbonate resin having a viscosity average molecular weight of 80,000 or more is more preferred, and a mixture with a polycarbonate resin having a viscosity average molecular weight of 100,000 or more is much more preferred. In other words, what has a molecular weight distribution with two distinct peaks observed by a measurement method such as GPC (Gel Permeation Chromatography) can be preferably used.

The viscosity average molecular weight M in the present invention is obtained by first calculating a specific viscosity from the following equation using a solution prepared by dissolving 0.7 g of a polycarbonate resin in 100 ml of methylene chloride at 20° C. and an Ostwald's viscometer:

$$\text{specific viscosity } (\eta_{sp})=(t-t_0)/t_0$$

[$t_0$ is the time (seconds) required for the dropping of methylene chloride, and t is the time (seconds) required for the dropping of the sample solution]

and inserting the obtained specific viscosity into the following equation:

$$\eta_{sp}/c=[\eta]+0.45\times[\eta]^2 c \text{ ([}\eta\text{] is an intrinsic viscosity)}$$

$$[\eta]=1.23\times10^{-4}M^{0.83}$$

c=0.7.

The aromatic polycarbonate as the component A-1 of the present invention is the above aromatic polycarbonate resin and contains substantially no halogen atom. The expression "substantially no halogen atom" means that no halogen-substituted diphenol is contained in the molecule except for trace amounts of the residual solvent (halogenated hydrocarbon) and carbonate precursor in the method of producing the above aromatic polycarbonate.

Preferably, the above aromatic polycarbonate resin (PC) as the component A-1 of the present invention has an acid value of −0.5 to 5.0 (mg-equivalent of acid/10 kg of PC). When the acid value is in the range of −0.5 to 5.0 (mg-equivalent of acid/10 kg of PC), the silicone compound (component B) of the present invention functions effectively and exhibits tracking resistance, antistatic properties and resin dripping preventing properties at the time of combustion with ease. An aromatic polycarbonate resin having an acid value of 0.0 to 3.0 (mg-equivalent of acid/10 kg of PC) is more preferred. When the acid value is smaller than −0.5 (mg-equivalent of acid/10 kg of PC), the aromatic polycarbonate resin itself becomes highly alkaline and the thermal stability of the obtained composition lowers. When the acid value is larger than 5.0 (mg-equivalent of acid/10 kg of PC), a free acid or phenolic terminal group contained in the aromatic polycarbonate resin is bonded to the Si—H group contained in the silicone compound (component B), thereby making it difficult to exhibit tracking resistance, antistatic properties and resin dripping preventing properties at the time of combustion.

The acid value as used herein means the amount of an acid or base contained per 10 kg of a polycarbonate resin (10 kg of PC). 1 ml of $C_{15}H_{17}CN_4$—$C_{16}H_{18}CIN_3S.nH_2O$ is added as an indicator to a solution prepared by adding 3 ml of methanol to 100 ml of methylene chloride and dissolving 10.0 g of a polycarbonate resin in the resulting mixture at 20° C. as a sample and the sample solution is titrated with 0.01 mol/l of sodium methylate ($CH_3ONa$) to obtain an acid value by inserting the titer including the sample and the titer without the sample into the following equation.

$$V = N \times k \times (X-Y) \times 10000/W$$

V: acid value (mg-equivalent of acid/10 kg of PC)
N: mol/l of sodium methylate ($CH_3ONa$)
k: factor of 0.01 mol/l $CH_3ONa$
X: titer including sample (ml)
Y: titer without sample (ml)
W: amount of sample (g)

Hydrochloric acid or the like for removing a catalyst such as triethylamine used to promote a reaction may be used in the method of producing an aromatic polycarbonate resin by the interfacial polycondensation method. In this case, the acid value of the aromatic polycarbonate resin can be adjusted to a range of −0.5 to 5.0 (mg-equivalent of acid/10 kg of PC) by adding a suitable amount of an alkali component to neutralize an acid component derived from hydrochloric acid or by intensifying a purification step such as rinsing. In the method of producing an aromatic polycarbonate resin by the interfacial polycondensation method using no catalyst, the acid value can be adjusted to a range of −0.5 to 5.0 (mg-equivalent of acid/10 kg of PC) by adding a suitable amount of an acid component to neutralize an alkali component derived from an acid binder such as sodium hydroxide or by intensifying a purification step such as rinsing.

The styrene-based resin as the component A-2 which can be used as a resin component (A) in the resin composition of the present invention is obtained by polymerizing a styrene-based monomer and optionally at least one selected from another vinyl monomer and a rubber polymer copolymerizable with the styrene-based monomer.

Examples of the styrene-based monomer used in the above styrene-based resin component include styrene and styrene derivatives such as α-methylstyrene, o-methylstyrene, p-methylstyrene, vinylxylene, ethylstyrene, dimethylstyrene, p-tert-butylstyrene, vinylnaphthalene and methoxystyrene. Styrene is particularly preferred. They may be used alone or in combination of two or more.

Examples of the another vinyl monomer copolymerizable with the above styrene-based monomer include vinyl cyanide compounds such as acrylonitrile and methacrylonitrile; aryl esters of acrylic acid such as phenyl acrylate and benzyl acrylate; alkyl esters of acrylic acid such as methyl acrylate, ethyl acrylate, propyl acrylate, butyl acrylate, amyl acrylate, hexyl acrylate, 2-ethylhexyl acrylate, octyl acrylate, cyclohexyl acrylate and dodecyl acrylate; aryl esters of methacrylic acid such as phenyl methacrylate and benzyl methacrylate; alkyl esters of methacrylic acid such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate and dodecyl methacrylate; epoxy group-containing methacrylic acid esters such as glycidyl methacrylate; maleimide-based monomers such as maleimide, N-methylmaleimide and N-phenylmaleimide; and α, β-unsaturated carboxylic acids and anhydrides thereof such as acrylic acid, methacrylic acid, maleic acid, maleic anhydride, phthalic acid and itaconic acid.

Examples of the rubber polymer copolymerized with the above styrene-based monomer include polybutadiene, polyisoprene, diene-based copolymers such as styrene.butadiene random copolymer and block copolymer, acrylonitrile.butadiene copolymer, copolymers of an alkyl acrylic acid ester or alkyl methacrylic acid ester and butadiene, and butadiene-isoprene copolymer; copolymers of ethylene and an α-olefin such as ethylene.propylene random copolymer and block copolymer, and ethylene.butene random copolymer and block copolymer; copolymers of ethylene and an unsaturated carboxylic acid ester such as ethylene-methacrylate copolymer and ethylene.butyl acrylate copolymer; copolymers of ethylene and an aliphatic vinyl such as ethylene vinyl acetate copolymer; terpolymers of ethylene, propylene and a non-conjugated diene such as ethylene.propylene.hexadiene terpolymer; acrylic rubbers such as polybutyl acrylate; and composite rubbers having a structure that a polyorganosiloxane rubber component and polyalkyl (meth)acrylate rubber component are entangled with each other so that they cannot be separated from each other (IPN type rubbers).

Illustrative examples of the styrene-based resin (component A-2) include polystyrene, styrene.butadiene.styrene copolymer (SBS resin), hydrogenated styrene.butadiene.styrene copolymer (hydrogenated SBS resin), hydrogenated styrene.isoprene.styrene copolymer (SEPS resin), high-impact polystyrene (HIPS), acrylonitrile styrene copolymer (AS resin), acrylonitrile.butadiene.styrene copolymer (ABS resin), methyl methacrylate.butadiene.styrene copolymer (MBS resin), methyl methacrylate.acrylonitrile.butadiene.styrene copolymer (MABS resin), acrylonitrile.acrylic rubber.styrene copolymer (AAS resin), acrylonitrile.ethylene propylene-based rubber.styrene copolymer (AES resin), styrene.IPN type rubber copolymer and mixtures thereof. The above styrene-based resins may have high stereoregularity like syndiotactic polystyrene due to use of a catalyst such as a metallocene catalyst for production. Further, a polymer and copolymer having a narrow molecular weight distribution, block copolymer, and polymer and copolymer having high stereoregularity all of which are obtained by the method such as anion living polymerization or radical living polymerization may also be used according to circumstances. Out of these, polystyrene (PS), high-impact polystyrene (HIPS), acrylonitrile.styrene copolymer (AS resin), methyl methacrylate.butadiene.styrene copolymer (MBS resin) and acrylonitrile.butadiene.styrene copolymer (ABS resin) are preferred and ABS resin is the most preferred. The styrene-based resins may be used in combination of two or more.

The ABS resin is a mixture of a thermoplastic graft copolymer obtained by graft polymerizing a vinyl cyanide compound and an aromatic vinyl compound with a diene-based rubber component and a copolymer of a vinyl cyanide compound and an aromatic vinyl compound. The diene-based rubber component forming this ABS resin is a rubber having a glass transition point of 10° C. or less such as polybutadiene, polyisoprene or styrene.butadiene copolymer and used in an amount of preferably 5 to 80 wt %, more preferably 10 to 50 wt % based on 100 wt % of the ABS resin component. Examples of the vinyl cyanide compound to be graft polymerized with the diene-based rubber component are those enumerated above, out of which acrylonitrile is particularly preferred. Examples of the aromatic vinyl compound to be graft polymerized with the diene-based rubber component are those enumerated above, out of which styrene and α-methylstyrene are particularly preferred. The total amount of the components to be graft polymerized with the diene-based rubber component is preferably 95 to 20 wt %, more preferably 50 to 90 wt % based on 100 wt % of the ABS resin component. Preferably, the amount of the vinyl cyanide compound is 5 to 50 wt % and the amount of the aromatic vinyl compound is 95 to 50 wt % based on 100 wt % of the total of the vinyl cyanide compound and the aromatic vinyl compound. Methyl (meth)acrylate, ethyl acrylate, maleic anhydride or N-substituted maleimide may be mixed with part of the components to be graft polymerized with the above diene-based rubber component. The total amount of the above substances is preferably 15 wt % or less based on the ABS resin component. Conventionally known initiators, chain transfer agents, emulsifiers and the like used for a reaction may be further used as required.

The weight average particle diameter of the rubber particles contained in the ABS resin is preferably 0.1 to 5.0 $\mu$m, more preferably 0.15 to 1.5 $\mu$m, particularly preferably 0.2 to 1 $\mu$m. A rubber having a particle size distribution with a single peak or two or more peaks may be used and a rubber having such morphology that rubber particles form a single phase or that a salami structure is formed by containing an occluded phase around each rubber particle may also be used.

It has been well known that ABS resin contains a vinyl cyanide compound and an aromatic vinyl compound which are not graft polymerized with a diene-based rubber component, and the ABS resin of the present invention may contain a free polymer component formed by polymerization. The molecular weight of a free copolymer of a vinyl cyanide compound and an aromatic vinyl compound is preferably 0.2 to 1.0, more preferably 0.25 to 0.5 in terms of reduced viscosity (dl/g).

The graft ratio of the total of the grafted vinyl cyanide compound and aromatic vinyl compound to the diene-based rubber component is preferably 20 to 200 wt %, more preferably 20 to 70 wt %.

This ABS resin may be produced by bulk polymerization, suspension polymerization or emulsion polymerization, or by single-stage or multi-stage copolymerization. What is obtained by mixing a vinyl compound polymer obtained by copolymerizing an aromatic vinyl compound and a vinyl cyanide component with the ABS resin obtained by the above production method may also be preferably used.

The aromatic polyester resin as the component A-3 which can be used as a resin component (A) in the resin composition of the present invention is a polymer or copolymer comprising an aromatic dicarboxylic acid or a reactive derivative thereof and a diol or an ester derivative thereof as the main components and obtained from a condensation reaction.

Preferred examples of the aromatic dicarboxylic acid include terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenylether dicarboxylic acid, 4,4'-biphenylmethanedicarboxylic acid, 4,4'-biphenylsulfonedicarboxylic acid, 4,4'-biphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid and 2,5-pyridinedicarboxylic acid. Out of these, terephthalic acid and 2,6-naphthalenedicarboxylic acid are particularly preferred.

These aromatic dicarboxylic acids may be used in combination of two or more. The dicarboxylic acid may be mixed with one or more of aliphatic dicarboxylic acids such as adipic acid, azelaic acid, sebacic acid and dodecanoic diacid, and alicyclic dicarboxylic acids such as cyclohexanedicarboxylic acid if small in quantity.

Examples of the diol as a component of the aromatic polyester of the present invention include aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol and triethylene glycol; alicyclic diols such as 1,4-cyclohexane dimethanol; diols containing an aromatic ring such as 2,2-bis($\beta$-hydroxyethoxyphenyl)propane; and mixtures thereof. One or more long-chain diols having a molecular weight of 400 to 6,000 such as polyethylene glycol, poly-1,3-propylene glycol and polytetramethylene glycol may be copolymerized if small in quantity.

The aromatic polyester of the present invention can be branched by introducing a small amount of a branching agent. The branching agent is not limited to a particular type but selected from trimesic acid, trimellitic acid, trimethylol ethane, trimethylol propane and pentaerythritol.

Illustrative examples of the aromatic polyester resin (component A-3) include polyethylene terephthalate (PET), polypropylene terephthalate, polybutylene terephthalate (PBT), polyhexylene terephthalate, polyethylene naphthalate (PEN), polybutylene naphthalate (PBN), polyethylene-1,2-bis(phenoxy)ethane-4,4'-dicarboxylate, and copolyesters such as polyethylene isophthalate/terephthalate and polybutylene terephthalate/isophthalate, and mixtures thereof. Out of these, polyethylene terephthalate and polyethylene naphthalate which comprise ethylene glycol as a diol component are preferred when good balance between thermal properties and mechanical properties is required. What comprise 50 wt % or more of polyethylene terephthalate or polyethylene naphthalate based on 100 wt % of the aromatic polyester resin are preferred and what comprise 50 wt % or more of polyethylene terephthalate are particularly preferred. Polybutylene terephthalate and polybutylene naphthalate which comprise butylene glycol as a diol component are also preferred when good balance between moldability and mechanical properties is required, and the weight ratio of polybutylene terephthalate to polyethylene terephthalate is preferably 2 to 10.

The terminal group structure of the obtained aromatic polyester resin is not particularly limited. The amount of the terminal hydroxyl group may be the same, larger or smaller than the amount of the terminal carboxyl group. These terminal groups may be capped by reacting a compound which has reactivity with these terminal groups.

The aromatic polyester resin is produced by polymerizing the above dicarboxylic acid component and diol component under heating in the presence of a polymerization catalyst containing titanium, germanium or antimony and removing the by-produced water, lower alcohol or diol to the outside of the system in accordance with a commonly used method. The germanium-containing polymerization catalyst is, for example, an oxide, hydroxide, halide, alcoholate or phenolate of germanium, as exemplified by germanium oxide, germanium hydroxide, germanium tetrachloride and tetramethoxy germanium.

A conventionally known compound of manganese, zinc, calcium, magnesium or the like used in the ester exchange reaction before polycondensation may be used in the present invention and polycondensation can be carried out by deactivating the above catalyst with a compound of phosphoric acid or phosphorous acid after the end of the ester exchange reaction.

The molecular weight of the aromatic polyester resin is not particularly limited but its intrinsic viscosity measured at 35° C. in an o-chlorophenol solvent is 0.4 to 1.2, preferably 0.6 to 1.15.

As for the ratio of the aromatic polycarbonate resin (component A-1), the styrene-based resin (component A-2) and/or the aromatic polyester resin (component A-3) in the aromatic polycarbonate resin composition (A) of the present invention, the amount of the aromatic polycarbonate resin is 100 to 50 wt %, preferably 99.5 to 50 wt % and the total amount of the styrene-based resin and/or the aromatic polyester resin is 0 to 50 wt %, preferably 0.5 to 50 wt % based on 100 wt % of the total of the aromatic polycarbonate resin, the styrene-based resin and/or the aromatic polyester resin. When the amount of the aromatic polycarbonate resin (component A-1) is smaller than 50 wt %, that is, the total amount of the styrene-based resin (component A-2) and/or the aromatic polyester resin (component A-3) is larger than 50 wt %, flame retardancy becomes unsatisfactory.

The silicone compound (component B) used as a flame retardant in the resin composition of the present invention is a specific silicone compounds having Si—H bonds. That is, it is a silicone compound (component B) which contains an Si—H group and an aromatic group in the molecule and is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

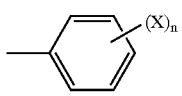
(1)

wherein X's are each independently an OH group or the residual monovalent organic group having 1 to 20 carbon atoms, and n is 0 or an integer of 1 to 5, with the proviso that when n is 2 or more, X's can differ from one another.

The silicone compound is preferably at least one selected from silicone compounds which contain a constituent unit represented by at least one of the following general formulas (2) and (3) as an Si—H bond containing unit:

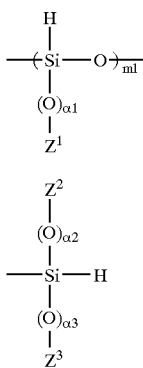

wherein $Z^1$ to $Z^3$ are each independently a hydrogen atom, the residual monovalent organic group having 1 to 20 carbon atoms, or compound represented by the following general formula (4), α1 to α3 are each independently 0 or 1, and m1 is 0 or an integer of 1 or more, with the proviso that when m1 is 2 or more, the recurring units can differ from one another:

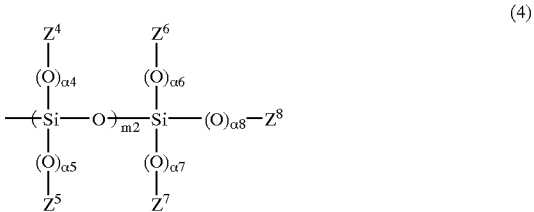

wherein $Z^4$ to $Z^8$ are each independently a hydrogen atom or the residual monovalent organic group having 1 to 20 carbon atoms, α4 to α8 are each independently 0 or 1, and m2 is 0 or an integer of 1 or more, with the proviso that when m2 is 2 or more, the recurring units can differ from one another.

The silicone compound is more preferably a silicone compound comprising an MD unit or MDT unit when M is a monofunctional siloxane unit, D is a bifunctional siloxane unit and T is a trifunctional siloxane unit.

Examples of the residual monovalent organic group having 1 to 20 carbon atoms represented by $Z^1$ to $Z^8$ in the constituent units of the above general formulas (2), (3) and (4) and X in the general formula (1) include alkyl groups such as methyl group, ethyl group, propyl group, butyl group, hexyl group and decyl group, cycloalkyl groups such as cyclohexyl group, alkenyl groups such as vinyl group and allyl group, aryl groups such as phenyl group and tolyl group, and aralkyl groups, and these groups may contain a functional group such as epoxy group, carboxyl group, carboxylic anhydride group, amino group or mercapto group. The organic group is preferably an alkyl group having 1 to 8 carbon atoms, alkenyl group or aryl group, particularly preferably an alkyl group having 1 to 4 carbon atoms such as methyl group, ethyl group or propyl group, vinyl group or phenyl group.

When the silicone compound which contains a constituent unit represented by at least one of the above general formulas (2) and (3) has plural kinds of siloxane bonds as a recurring unit, they may be random copolymerized, block copolymerized or tapered copolymerized.

In the present invention, the Si—H content of the silicone compound as the component B must be in the range of 0.1 to 1.2 mols/100 g. When the Si—H content is in the range of 0.1 to 1.2 mols/100 g, the formation of the structure of silicone becomes easy at the time of combustion. The silicone compound more preferably has an Si—H content of 0.2 to 1.0 mol/100 g. When the Si—H content is lower than 0.1 mol/100 g, the formation of the structure of silicone becomes difficult and when the content is higher than 1.2 mols/100 g, the thermal stability of the obtained composition lowers and a surplus Si—H group reacts with water in the air to generate hydrogen gas at the time of a moist heat treatment with the result that the obtained resin composition is foamed and a molded article becomes cloudy. The expression "structure of silicone" means a network structure formed by a reaction between silicone compounds or a reaction between the resin and silicone.

The expression "Si—H content" as used herein means the number of mols of a Si—H structure contained per 100 g of the silicone compound, which can be obtained by measuring the volume of hydrogen gas generated per the unit weight of the silicone compound by an alkaline fission method. For instance, when 122 ml of hydrogen gas is generated per 1 g of the silicone compound at 25° C., the Si—H content becomes 0.5 mol/100 g according to the following calculation expression.

$$122 \times 273/(273+25) \div 22400 \times 100 \approx 0.5$$

In order to suppress the clouding of a molded article or a decline in the transparency caused by a moist heat treatment of the resin composition obtained by mixing the silicone compound with the resin components (A), particularly the component A-1, the dispersion state of the silicone compound is important. When the silicone compound is maldistributed, the resin composition itself becomes cloudy and further peeling occurs on the surface of a molded article, or the silicone compound is shifted and maldistributed at the time of a moist heat treatment with the result of a decline in transparency, thereby making it difficult to obtain a molded article having excellent transparency. Important factors for determining the dispersion state are the content of the aromatic group in the silicone compound and the average degree of polymerization. The average degree of polymerization is particularly important in the transparent resin composition of the present invention.

From the above point of view, the silicone compound of the present invention must have an aromatic group content of 10 to 70 wt %. The silicone compound preferably has an aromatic group content of 15 to 60 wt %. When the aromatic group content of the silicone compound is lower than 10 wt %, the silicone compound becomes maldistributed and not dispersed well, thereby making it difficult to obtain a molded article having excellent transparency. When the aromatic group content is higher than 70 wt %, the silicone compound also becomes maldistributed and not dispersed well due to high stiffness of its molecules, thereby making it difficult to obtain a molded article having excellent transparency.

The expression "aromatic group content" as used herein means the content of an aromatic group represented by the following general formula (1) which can be obtained from the following calculation expression.

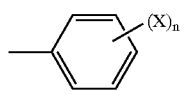
(1)

Aromatic group content=$[A/M] \times 100$ (wt %)

A and M in the above expression represent the following respective numeral values.

A=total molecular weight of all aromatic groups represented by the general formula (1) contained in one molecule of silicone compound M=molecular weight of silicone compound Further, the silicone compound (component B) of the present invention preferably has a refractive index at 25° C. of 1.40 to 1.60. The refractive index is more preferably 1.42 to 1.59, the most preferably 1.44 to 1.59. When the refractive index falls within the above range, the silicone compound is finely dispersed in the aromatic polycarbonate, thereby making it possible to provide a resin composition which is little cloudy and has excellent dyeing properties.

Further, the silicone compound (component B) of the present invention preferably has a volatility measured by a heating loss method of 18% or less when it is heated at 105° C. for 3 hours. The volatility is more preferably 10% or less. When the volatility is larger than 18%, the volatility of the silicone compound becomes large at the time of producing a resin composition, whereby it may be difficult to form a molded article from the resin composition of the present invention.

The silicone compound containing a constituent unit represented by the above general formula may have a linear or branched structure if it satisfies the above conditions and a compound having a Si—H group in the side chain, terminal or branch of its molecular structure or at a plurality of sites may be used.

In general, the structure of the silicone compound is constructed by combining the following four siloxane units arbitrarily.

M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$ D unit: bifunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$ T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$ Q unit: tetrafunctional siloxane unit such as $SiO_2$ The structure of the silicone compound used in the present invention is represented by the rational formula $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is preferably represented by the formula $M_mD_n$, $M_mT_p$, $M_mD_nT_p$ or $M_mD_nQ_q$, more preferably $M_mD_n$ or $M_mD_nT_p$ (the coefficients m, n, p and q in the above rational formulas represent the polymerization degrees of the respective siloxane units, and the total of the coefficients represents the average polymerization degree of the silicone compound. In the present invention, the average polymerization degree is preferably in the range of 3 to 150, more preferably 3 to 80, particularly preferably 3 to 60. When any one of m, n, p and q is a numerical value of 2 or more, the number of the siloxane units of the coefficient can be 2 or more which differ from one another in the hydrogen atom or the residual organic group bonding to silicon atoms.)

The above silicone compounds may be used alone or in combination of two or more.

The above silicone compound having an Si—H bond can be produced by a method known per se. For example, the compound of interest can be obtained by cohydrolyzing an organochlorosilane corresponding to the structure of the silicone compound of interest and removing by-produced hydrochloric acid and low-boiling matter. When a silicone oil, cyclic siloxane or alkoxysilane having a Si—H bond, an aromatic group represented by the general formula (1) and other residual organic group in the molecule is used as a starting material, the silicone compound of interest can be obtained by promoting a polymerization reaction using an acid catalyst such as hydrochloric acid, sulfuric acid or methanesulfonic acid or adding water for hydrolysis according to circumstances and then removing the used acid catalyst and low-boiling matter.

The silicone compound as the component B is used in an amount of 0.1 to 10 parts by weight, preferably 0.3 to 7 parts by weight, more preferably 0.5 to 5 parts by weight based on 100 parts by weight of the total of the resin components (A).

At least one compound selected from a radical generator, organic alkali metal salt and organic alkali earth metal salt can be mixed with the resin composition of the present invention as the component C. By mixing this component C, the flame retardancy can be further improved and particularly dripping preventing properties are improved. In the present invention, the component C is referred to as "flame retardancy improving agent". The amount of the component C as a flame retardancy improving agent is 0.001 to 0.3 part by weight, preferably 0.005 to 0.3 part by weight, more preferably 0.005 to 0.2 part by weight based on 100 parts by weight of the total of the resin components (A).

Examples of the radical generator used as the component (C) of the present invention include organic peroxides such as 2,5-dimethyl-2,5-di(t-butylperoxy)hexyne-3 and dicumyl peroxide, and 2,3-dimethyl-2,3-diphenylbutane(so-called dicumyl). They are commercially available under the trade names of Perhexyne 25B, Percumyl D and Nofiner BC from NOF Corporation and easily acquired.

2,3-dimethyl-2,3-diphenylbutane(dicumyl) is particularly preferred because it rarely generates a radical at the time of melt kneading but generates a stable radical effectively at the time of combustion.

The alkali metal salt or alkali earth metal salt used as the component (C) in the present invention may be a metal salt which has been used to flame-retard a polycarbonate resin, especially a metal salt of an organic sulfonic acid or a metal salt of a sulfuric acid ester. They may be used alone or in combination of two or more. The alkali metal of the present invention is lithium, sodium, potassium, rubidium or cesium, and the alkali earth metal is beryllium, magnesium, calcium, strontium or barium. Out of these, lithium, sodium and potassium are particularly preferred.

The above metal salt of an organic sulfonic acid is an alkali metal salt of an aliphatic sulfonic acid, alkali earth metal salt of an aliphatic sulfonic acid, alkali metal salt of an aromatic sulfonic acid or alkali earth metal salt of an aromatic sulfonic acid. Preferred examples of the metal salt of an aliphatic sulfonic acid include alkali (earth) metal salts of an alkanesulfonic acid, alkali (earth) metal salts of a sulfonic acid obtained by substituting at least one hydrogen atom of the alkyl groups of the alkali (earth) metal salts of an alkanesulfonic acid with a fluorine atom, and alkali (earth) metal salts of a perfluoroalkanesulfonic acid. They may be used alone or in combination of two or more ("the alkali (earth) metal salts" include both alkali metal salts and alkali earth metal salts).

Preferred examples of the alkanesulfonic acid used in the alkali (earth) metal salts of an alkanesulfonic acid include methanesulfonic acid, ethanesulfonic acid, propanesulfonic acid, butanesulfonic acid, methylbutanesulfonic acid, hexanesulfonic acid, heptanesulfonic acid and octanesulfonic acid. They may be used alone or in combination of two or more. Metals salts obtained by substituting some hydrogen atoms of the alkyl groups with a fluorine atom may also be used.

Preferred examples of the perfluoroalkanesulfonic acid include perfluromethanesulfonic acid, perfluoroethanesulfonic acid, perfluoropropanesulfonic acid, perlfuorobutanesulfonic acid, perfluoromethylbutanesulfonic acid, perfluorohexanesulfonic acid, perfluoroheptanesulfonic acid and perfluorooctanesulfonic acid. Out of these, perfluoroalkanesulfonic acids having 1 to 8 carbon atoms are particularly preferred. They may be used alone or in combination of two or more.

Sodium salts of ethanesulfonic acid are preferred as the alkali (earth) metal salt of an alkanesulfonic acid and potassium salts of perfluorobutanesulfonic acid are preferred as the alkali (earth) metal salt of a perfluoroalkanesulfonic acid.

The aromatic sulfonic acid used in the alkali (earth) metal salt of an aromatic sulfonic acid is at least one acid selected from the group consisting of a sulfonic acid of a monomeric or polymeric aromatic sulfide, sulfonic acid of an aromatic carboxylic acid or ester, sulfonic acid of a monomeric or polymeric aromatic ether, sulfonic acid of an aromatic sulfonate, monomeric or polymeric aromatic sulfonic acid, monomeric or polymeric aromatic sulfonesulfonic acid, sulfonic acid of an aromatic ketone, heterocyclic sulfonic acid, sulfonic acid of an aromatic sulfoxide, and methylene bond condensate of aromatic sulfonic acids. They may be used alone or in combination of two or more.

The alkali (earth) metal salts of a sulfonic acid of a monomeric or polymeric aromatic sulfide are disclosed in JP-A 50-98539 and include disodium diphenyl sulfide-4,4'-disulfonate and dipotassium diphenyl sulfide-4,4'-disulfonate.

The alkali (earth) metal salts of a sulfonic acid of an aromatic carboxylic acid or ester are disclosed in JP-A 50-98540 and include potassium 5-sulfoisophthalate, sodium 5-sulfoisophthalate and polysodium polyethylene terephthalate polysulfonate.

The alkali (earth) metal salts of a sulfonic acid of a monomeric or polymeric aromatic ether are disclosed in JP-A 50-98542 and include calcium 1-methoxynaphthalene-4-sulfonate, disodium 4-dodecylphenyl ether disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide)polysulfonate and lithium poly(2-fluoro-6-butylphenylene oxide)polysulfonate.

The alkali (earth) metal salts of a sulfonic acid of an aromatic sulfonate are disclosed in JP-A 50-98544 and include potassium sulfonate of benzenesulfonate.

The alkali (earth) metal salts of a monomeric or polymeric aromatic sulfonic acid are disclosed in JP-A 50-98546 and include sodium benzenesulfonate, strontium benzenesulfonate, magnesium benzenesulfonate, dipotassium p-benzenedisulfonate, dipotassium naphthalene-2,6-disulfonate and calcium biphenyl-3,3'-disulfonate.

The alkali (earth) metal salts of a monomeric or polymeric aromatic sulfonesulfonic acid are disclosed in JP-A 52-54746 and include sodium diphenylsulfone-3-sulfonate, potassium diphenylsulfone-3-sulfonate, dipotassium diphenylsulfone-3,3'-disulfonate and dipotassium diphenylsulfone-3,4'-disulfonate.

The alkali (earth) metal salts of a sulfonic acid of an aromatic ketone are disclosed in JP-A 50-98547 and include sodium $\alpha,\alpha,\alpha$-trifluoroacetophenone-4-sulfonate and dipotassium benzophenone-3,3'-disulfonate.

The alkali (earth) metal salts of an heterocyclic sulfonic acid are disclosed in JP-A 50-116542 and include disodium thiophene-2,5-disulfonate, dipotassium thiophene-2,5-disulfonate, calcium thiophene-2,5-disulfonate and sodium benzothiophenesulfonate.

The alkali (earth) metal salts of a sulfonic acid of an aromatic sulfoxide are disclosed in JP-A 52-54745 and include potassium diphenylsulfoxide-4-sulfonate.

The methylene bond condensates of the alkali (earth) metal salts of aromatic sulfonic acids include a condensate of formalin and sodium naphthalenesulfonate and a condensate of formalin and sodium anthracenesulfonate.

The alkali (earth) metal salts of a sulfuric acid ester are alkali (earth) metal salts of a sulfuric acid ester of a monohydric and/or polyhydric alcohol(s) such as methyl sulfuric acid ester, ethyl sulfuric acid ester, lauryl sulfuric acid ester, hexadecyl sulfuric acid ester, sulfuric acid ester of a polyoxyethylene alkylphenyl ether, mono-, di-, tri- and tetrasulfuric acid esters of pentaerythritol, sulfuric acid ester of monoglyceride laurate, sulfuric acid ester of monoglyceride palmitate and sulfuric acid ester of monoglyceride stearate. Alkali (earth) metal salts of a laurylsulfuric acid ester are particularly preferred as the alkali (earth) metal salts of a sulfuric acid ester.

Other alkali (earth) metal salts include alkali (earth) metal salts of an aromatic sulfonamide such as alkali (earth) metal salts of saccharin, N-(p-tolylsulfonyl)-p-toluenesulfoimide, N-(N'-benzylaminocarbonyl)sulfanilimide and N-(phenylcarboxyl)sulfanilimide.

Out of the above alkali (earth) metal salts, alkali (earth) metal salts of an aromatic sulfonic acid and alkali (earth) metal salts of a perfluoroalkanesulfonic acid are preferred.

The flame retardant resin composition of the present invention is prepared by mixing a specific silicone compound (component B) as a flame retardant with resin components (A) including an aromatic polycarbonate resin as the main component in a specific ratio.

That is, according to the present invention, there is provided a flame retardant aromatic polycarbonate resin composition which has excellent dripping preventing properties at the time of combustion and does not comprise a halogen-based flame retardant such as a bromine compound as a flame retardant (may be simply referred to as "halogen-free" hereinafter) by combining resin components (A) including an aromatic polycarbonate resin as the main component, a silicone compound (component B) and optionally a flame retardancy improving agent (component C). Another resin, filler and other additives may be mixed with the resin composition of the present invention like an ordinary polycarbonate resin composition. The another resin, filler and other additives will be described in detail hereinafter.

A description is subsequently given of a typical preferred embodiment of the present invention.

This preferred embodiment is a halogen-free flame retardant aromatic polycarbonate resin composition which provides a molded article having excellent transparency and resistance to moist heat.

No halogen-free flame retardant aromatic polycarbonate resin composition which is relatively simple in composition and has excellent transparency and resistance to moist heat has been found in the prior practical use.

According to the present invention, there is provided a transparent flame retardant aromatic polycarbonate resin composition which comprises 100 parts by weight of an aromatic polycarbonate resin (component A-1) and 0.1 to 10 parts by weight of a silicone compound (component B) which contains an Si—H group and an aromatic group in the molecule, wherein the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

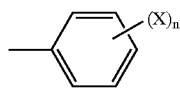

(1)

wherein X's are each independently an OH group or the residual monovalent organic group having 1 to 20 carbon atoms, and n is 0 or an integer of 1 to 5, with the proviso that when n is 2 or more in the formula (1), X's can differ from one another.

This transparent flame retardant aromatic polycarbonate resin composition may be referred to as "transparent resin composition" in the following description. In this specification, both a transparent composition and an opaque composition will be simply referred to as "resin composition" or "flame retardant resin composition".

The above transparent resin composition of the present invention is a halogen-free resin composition which is simple in composition that it comprises 100 parts by weight of an aromatic polycarbonate resin (component A-1) as a resin component and 0.1 to 10 parts by weight of a silicone compound and has flame retardancy, transparency and resistance to moist heat.

This transparent resin composition comprises an aromatic polycarbonate resin (component A-1) as substantially the main resin component and may contain other resins (components A-2, A-3 and the like) in small amounts as far as they do not impair transparency. The silicon compound as the component B in the transparent resin composition is a silicone compound having a structure, average polymerization degree, Si—H content, aromatic group content and refractive index specified above, and preferred examples given above are also preferred as the silicone compound. Especially the average polymerization degree is preferably 3 to 80, more preferably 3 to 60, much more preferably 4 to 40, particularly preferably 4 to 20.

Further, the ratio of the aromatic polycarbonate resin (component A-1) to the silicone compound (component B) may be the same as the ratio of the total of the above resin components (components A) to the silicone compound (component B). The above flame retardancy improving agent (component C) may be used in the above transparent resin composition. When the flame retardancy improving agent (component C) is used in the above small amount, it exhibits its effect and does not impair the transparency of the resin in most cases.

Meanwhile, the transparent resin composition of the present invention may be mixed with another resin and a filler in limits which do not impair transparency but the types and amounts thereof must be selected in consideration of transparency because most of the resins and fillers impair transparency.

The transparent resin composition of the present invention provides a molded article having excellent transparency and resistance to moist heat. As will be described hereinafter, the haze of a 2 mm-thick molded article is 0.3 to 20%, preferably 0.5 to 15%. As will be described hereinafter, the difference $\Delta H$ ($H_1$—$H_0$) between the haze ($H_1$) of a 2 mm-thick molded article kept at a temperature of 65° C. and a humidity of 85% for 300 hours and the initial haze ($H_0$) of the molded article is 0.01 to 10%, preferably 0.02 to 7%. The transparent resin composition of the present invention is suitable for obtaining a molded article having excellent transparency and resistance to moist heat.

Since the transparent resin composition of the present invention is a halogen-free flame retardant resin composition, it can be advantageously used to obtain a molded article which needs to have transparency and resistance to moist heat.

Further, since the transparent resin composition of the present invention has excellent transparency, a molded article having excellent transparency and bright color can be obtained by mixing a pigment or dye with the resin composition.

The components A, B and C of the resin composition of the present invention have been described above. A filler, another resin and additives which can be mixed with this composition will be described hereinbelow.

The filler may be mixed with the resin composition of the present invention as a component (D). The mechanical strength of a molded article can be improved by mixing this filler (component D). Fillers which have been used to improve the strength of a resin molded article are used as the filler. The amount of the component D is 1 to 100 parts by weight, preferably 3 to 80 parts by weight, more preferably 5 to 60 parts by weight based on 100 parts by weight of the total of the resin components (A).

Examples of the component D include talc, mica, clay, wollatonite, calcium carbonate, glass fiber, glass bead, glass balloon, milled fiber, glass flake, carbon fiber, carbon flake, carbon bead, carbon milled fiber, metal flake, metal fiber, metal coated glass fiber, metal coated carbon fiber, metal coated glass flake, silica, ceramic particle, ceramic fiber, aramide particle, aramide fiber, polyarylate fiber, graphite, conductive carbon black and whiskers.

A thermoplastic resin other than the components A may be mixed with the resin composition of the present invention to improve the mechanical, chemical and electrical properties of a molded article. The amount of the thermoplastic resin which differs according to its type and purpose is generally 1 to 30 parts by weight, preferably 2 to 20 parts by weight based on 100 parts by weight of the total of the resin components (A).

Examples of the thermoplastic resin include general-purpose plastics typified by polyethylene resin, polypropylene resin and polyalkyl methacrylate resin; engineering plastics typified by polyphenylene ether resin, polyacetal resin, polyamide resin, cyclic polyolefin resin and polyarylate resin (noncrystalline polyarylate, liquid crystalline polyarylate); and super engineering plastics such as polyether ether ketone, polyether imide, polysulfone, polyether sulfone and polyphenylene sulfide. Further, a thermoplastic elastomer such as an olefin-based thermoplastic elastomer, polyamide-based thermoplastic elastomer or polyurethane-based thermoplastic elastomer may also be used.

Additives known per se may be mixed with the resin composition of the present invention in small amounts in order to provide various functions to a molded article and improve the characteristic properties of the molded article. The amount of each of these additives is normal unless it impairs the object of the present invention.

The additives include a flame retardant other than the component B (phosphoric acid ester, red phosphorus, metal hydrate, etc.), dripping preventing agent (fluorine-containing polymer having fibril forming capability, etc.), heat stabilizer, ultraviolet light absorber, light stabilizer, release agent, lubricant, sliding agent (PTFE particles, etc.), colorant (pigment or dye such as carbon black, titanium oxide, etc.), optical diffuser (acryl cross linked particle, silicone cross linked particle, thin glass flake, calcium carbonate particle, etc.), fluorescent brightener, luminous pigment, fluorescent dye, antistatic agent, flowability modifier, crystal nucleating agent, inorganic or organic anti-fungous agent, optical catalyst-based stain-resisting agent (a fine particle of titanium oxide, a fine particle of zinc oxide, etc.), impact modifier typified by graft rubber, infrared light absorber and photochromic agent.

The resin composition of the present invention comprises an aromatic polycarbonate resin as a resin component in an amount of 50 to 100 wt %. Therefore, additives used to improve the thermal stability, antioxidation properties, optical stability (ultraviolet stability) and mold release characteristics of the aromatic polycarbonate resin are advantageously used to improve the above properties of the resin composition. These additives will be described in detail hereinunder.

A phosphorus-containing stabilizer may be mixed with the resin composition of the present invention as a heat stabilizer. The phosphorus-containing stabilizer may be a phosphate compound, phosphonite compound or phosphate compound.

Various phosphite compounds may be used as a heat stabilizer. For example, a phosphite compound represented by the following general formulas (8) may be used:

(8)

wherein $R^8$ is a hydrogen atom, alkyl group having 1 to 20 carbon atoms, aryl group or alkylaryl group having 6 to 20 carbon atoms, aralkyl group having 7 to 30 carbon atoms or halo-, alkylthio-(alkyl group has 1 to 30 carbon atoms) or hydroxyl-substituted group thereof, with the proviso that three $R^8$'s may be the same or different and a cyclic structure derived from a diphenol may be formed.

A phosphate compound represented by the following general formulas (9) may also be used:

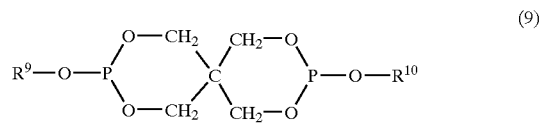

(9)

wherein $R^9$ and $R^{10}$ are each independently a hydrogen atom, alkyl group having 1 to 20 carbon atoms, aryl group or alkylaryl group having 6 to 20 carbon atoms, aralkyl group having 7 to 30 carbon atoms, cycloalkyl group having 4 to 20 carbon atoms, or 2-(4-oxyphenyl)propyl-substituted aryl group having 15 to 25 carbon atoms, with the proviso that the cycloalkyl group and aryl group may not be substituted or may be substituted by an alkyl group.

A phosphate compound represented by the following general formulas (10) may also be used:

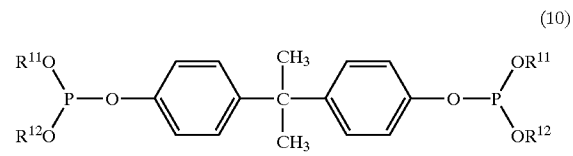

(10)

wherein $R^{11}$ and $R^{12}$ are each independently an alkyl group having 12 to 15 carbon atoms and may be the same or different.

The phosphonite compound as a heat stabilizer is a phosphonite compound represented by the following general formula (11) or (12):

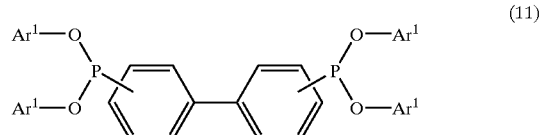

(11)

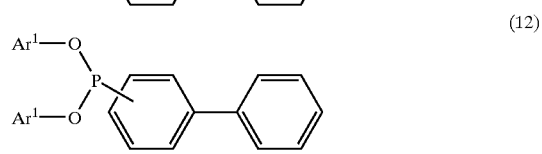

(12)

wherein $Ar^1$ and $Ar^2$ are each independently an aryl group or alkylaryl group having 6 to 20 carbon atoms or 2-(4-oxyphenyl)propyl-substituted aryl group having 15 to 25 carbon atoms, with the proviso that four $Ar^1$'s may be the same or different and two $Ar^2$'s may be the same or different.

Preferred examples of the phosphate compound represented by the above formula (8) include diphenylisooctyl phosphate, 2,2'-methylenebis(4,6-di-tert-butylphenyl)octyl phosphite, diphenyl mono(tridecyl)phosphite, phenyldiisodecyl phosphate and phenyl di(tridecyl)phosphite.

Preferred examples of the phosphate compound represented by the above general formula (9) include distearyl pentaerythritol diphosphite, bis(2,4-di-tert-butylphenyl) pentaerythritol diphosphite, bis(2,6-di-tert-butyl-4-methylphenyl)pentaerythritol diphosphite, phenyl bisphenol A pentaerythritol diphosphite and dicyclohexyl pentaerythritol diphosphite. Out of these, distearyl pentaerythritol diphosphite, bis(2,4-di-tert-butylphenyl)pentaerythritol diphosphite and bis(2,6-di-tert-butyl-4-methylphenyl) pentaerythritol diphosphite are more preferred. The above phosphite compounds may be used alone or in combination of two or more.

Preferred examples of the phosphate compound represented by the above general formula (10) include 4,4'-isopropylidene diphenoltetratridecyl phosphate.

Preferred examples of the phosphonite compound represented by the above formula (11) include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite. Out of these, tetrakis(di-tert-butylphenyl)-biphenylene diphosphonites are preferred and tetrakis(2,4-di-tert-butylphenyl)-biphenylene diphosphonites are more preferred. The tetrakis(2,4-di-tert-butylphenyl)-biphenylene diphosphonites are preferably used in combination of two or more. More specifically, one or two or more out of tetrakis(2,4-di-tert-butylphenyl)-4,4'-biphenylene diphosphonite (component E2-1), tetrakis(2,4-di-tert-butylphenyl)-4,3'-biphenylene diphosphonite (component E2-2), tetrakis(2,4-di-tert-butylphenyl)-3,3'-biphenylene diphosphonite (component E2-3) may be used but a mixture of the three is preferred. The weight ratio of the components E2–1, E2–2 and E2–3 in the mixture is preferably 100:37 to 64:4 to 14, more preferably 100:40 to 60:5 to 11.

Preferred examples of the phosphonite compound represented by the above general formula (12) include bis(2,4-di-iso-propylphenyl)-4-phenyl—phenyl phosphonite, bis(2,4-di-n-butylphenyl)-3-phenyl—phenyl phosphonite, bis(2,4-di-tert-butylphenyl)-4-phenyl—phenyl phosphonite, bis(2,4-di-tert-butylphenyl)-3-phenyl—phenyl phosphonite, bis(2,6-di-iso-propylphenyl)-4-phenyl—phenyl phosphonite, bis(2,6-di-n-butylphenyl)-3-phenyl—phenyl phosphonite, bis(2,6-di-tert-butylphenyl)-4-phenyl—phenyl phosphonite and bis(2,6-di-tert-butylphenyl)-3-phenyl—phenyl phosphonite. Out of these, bis(di-tert-butylphenyl)-phenyl—phenyl phosphonites are preferred and bis(2,4-di-tert-butylphenyl)-phenyl—phenyl phosphonites are more preferred. The bis(2,4-di-tert-butylphenyl)-phenyl—phenyl phosphonites are preferably used in combination of two or more. More specifically, one or both of bis(2,4-di-tert-butylphenyl)-4-phenyl—phenyl phosphonite and bis(2,4-di-tert-butylphenyl)-3-phenyl—phenyl phosphonite may be used but a mixture of the two is preferred. The weight ratio of the two components in the mixture is preferably 5:1 to 4, more preferably 5:2 to 3.

Examples of the phosphate compound as a heat stabilizer include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, trimethyl phosphate is preferred.

The phosphorus-containing stabilizer is more preferably a compound represented by the following general formula (13) or (14):

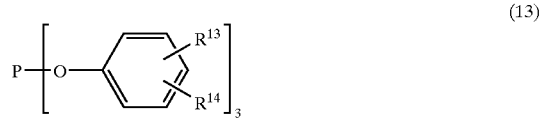

(13)

wherein $R^{13}$ and $R^{14}$ are each independently an alkyl group, cycloalkyl group, aryl group or aralkyl group having 1 to 12 carbon atoms,

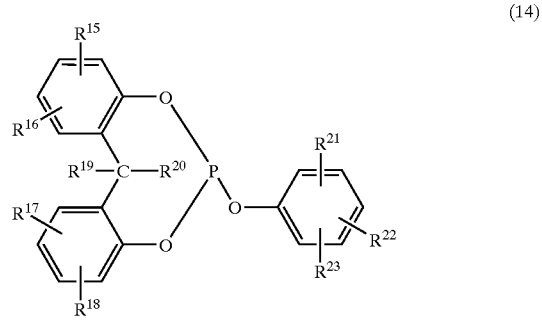

(14)

wherein $R^{15}$, $R^{16}$, $R^{17}$, $R^{18}$, $R^{21}$, $R^{22}$ and $R^{23}$ are each independently a hydrogen atom, alkyl group, cycloalkyl group, aryl group or aralkyl group having 1 to 12 carbon atoms, $R^{19}$ is a hydrogen atom or alkyl group having 1 to 4 carbon atoms, and $R^{20}$ is a hydrogen atom or methyl group.

In the formula (13), $R^{13}$ and $R^{14}$ are preferably an alkyl group having 1 to 12 carbon atoms, more preferably an alkyl group having 1 to 8 carbon atoms. Specific examples of the compound of the formula (13) include tris(dimethylphenyl) phosphite, tris(diethylphenyl)phosphite, tris(di-iso-propylphenyl)phosphite, tris(di-n-butylphenyl)phosphite, tris(2,4-di-tert-butylphenyl)phosphite and tris(2,6-di-tert-butylphenyl)phosphite. Out of these, tris(2,4-di-tert-butylphenyl)phosphite is particularly preferred.

The phosphorus compound represented by the formula (14) can be produced by a method known per se. For example, a bisphenol compound represented by the following general formula (15) and phosphorus trichloride are reacted to each other to obtain chlorinated phosphoric acid which is then reacted with a phenol represented by the following general formula (16).

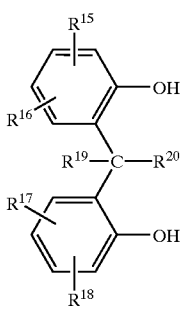

(15)

In the above formula (15), $R^{15}$, $R^{16}$, $R^{17}$ and $R^{18}$ are each independently a hydrogen atom, alkyl group, cycloalkyl group, aryl group or aralkyl group having 1 to 12 carbon atoms, respectively, $R^{19}$ is a hydrogen atom or alkyl group having 1 to 4 carbon atoms, and $R^{20}$ is a hydrogen atom or methyl group.

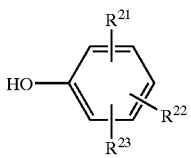

(16)

In the above formula (16), $R^{21}$, $R^{22}$ and $R^{23}$ are each independently a hydrogen atom, alkyl group, cycloalkyl group, aryl group or aralkyl group having 1 to 12 carbon atoms, respectively.

Preferred examples of the compound represented by the above general formula (15) include 2,2'-methylenebisphenol, 2,2'-methylenebis(4-methylphenol), 2,2'-methylenebis(6-methylphenol), 2,2'-methylenebis(4,6-dimethylphenol), 2,2'-ethylidenebisphenol, 2,2'-ethylidenebis(4-methylphenol), 2,2'-isopropylidenebisphenol, 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-methylenebis(4-methyl-6-cyclohexylphenol), 2,2'-dihydroxy-3,3'-di(α-methylcyclohexyl)-5,5'-dimethylphenylmethane, 2,2'-methylenebis(6-α-methylbenzyl-p-cresol), 2,2'-ethylidene-bis(4,6-di-tert-butylphenol) and 2,2'-butylidene-bis(4-methyl-6-tert-butylphenol).

Out of the above compounds of the general formula (15), 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-ethylidene-bis(4,6-di-tert-butylphenol) and 2,2'-butylidene-bis(4-methyl-6-tert-butylphenol) are more preferred.

Preferred examples of the compound represented by the general formula (16) include phenol, 2-methylphenol, 3-methylphenol, 4-methylphenol 2,4-dimethylphenol, 2,6-dimethylphenol, 2-tert-butyl-4-methylphenol, 2,4-di-tert-butylphenol, 2,6-di-tert-butylphenol, 2,6-di-tert-butyl-4-methylphenol, 2,4-dimethyl-6-tert-butylphenol, 2,6-di-tert-butyl-4-ethylphenol, 2,4,6-tri-tert-butylphenol and 2,6-di-tert-butyl-4-s-butylphenol. Out of the above compounds of the general formula (16), compounds having two or more alkyl substituents are more preferred.

The antioxidant which can be mixed with the resin composition of the present invention is a phenol-based antioxidant. The phenol-based antioxidant can suppress discoloration when the resin composition is exposed to heat and has the effect of improving flame retardancy to a certain extent. Various phenol-based antioxidants may be used.

Preferred examples of the phenol-based antioxidant include vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzyl phosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol bis[3-(3,5-di-tert-butyl-4-hydroxyphenyl)propionate, bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl) propionyloxy]-1,1-dimethylethyl}-2,4,8,10-tetraoxaspiro [5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl) isocyanurate, 1,3,5-tris2[3 (3,5-di-tert-butyl-4-hydroxyphenyl) propionyloxy] ethylisocyanurate and tetrakis[methylene-3-(3',5'-di-tert-butyl-4-hydroxyphenyl)propionate]methane.

Out of these, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 3,9-bis{2-[3-(3-tert-butyl-4-hydroxy-5-methylphenyl) propionyloxy]-1,1-dimethylethyl}-2,4,8,10-tetraoxaspiro [5,5]undecane and tetrakis[methylene-3-(3',5'-di-tert-butyl-4-hydroxyphenyl)propionate]methane are more preferred, and n-octadecyl-β-(4'-hydroxy-3',5'-di-tert-butylphenyl) propionate is particularly preferred.

A sulfur-containing antioxidant may be used as the antioxidant. It is particularly preferred when the resin composition is used for rotational molding or compression molding. Illustrative examples of the sulfur-containing antioxidant include dilauryl-3,3'-thiodipropionic acid ester, ditridecyl-3,3'-thiodipropionic acid ester, dimyristyl-3,3'-thiodipropionic acid ester, distearyl-3,3'-thiodipropionic acid ester, laurylstearyl-3,3'-thiodipropionic acid ester, pentaerythritol tetra(β-laurylthiopropionate)ester, bis[2-methyl-4-(3-laurylthiopropionyloxy)-5-tert-butylphenyl]sulfide, octadecyldisulfide, mercaptobenzimidazole, 2-mercapto-6-methylbenzimidazole and 1,1'-thiobis(2-naphthol). Out of these, pentaerythritol tetra(β-laurylthiopropionate)ester is more preferred.

The above phosphorus-containing stabilizers, phenol-based antioxidants and sulfur-containing antioxidants may be used alone or in combination of two or more. A phosphorus-containing stabilizer is more preferred and a phosphorus-containing stabilizer containing a compound represented by the above general formula (13) is particularly preferred.

As for the amount of the stabilizer in the composition, the amount of a phosphorus-containing stabilizer, phenol-based antioxidant or sulfur-containing antioxidant is preferably 0.0001 to 1 part by weight, more preferably 0.0005 to 0.5 part by weight, much more preferably 0.001 to 0.2 part by weight, respectively based on 100 parts by weight of the total of the resin components (A).

A release agent may be mixed with the resin composition of the present invention as required. Since the component B has flame retardancy in the present invention, even when a release agent which readily exerts a bad influence upon flame retardancy is compounded, excellent flame retardancy can be achieved. Any known release agent may be used, as exemplified by saturated aliphatic acid esters, unsaturated aliphatic acid esters, polyolefin-based waxes (polyethylene wax, 1-alkene polymers and also what are obtained by modifying them with a functional group-containing compound that is typified by acid-modifying), silicone compounds (other than the component B of the present invention, such as linear and cyclic polydimethylsiloxane oils, polymethylphenyl silicone oils, and what are obtained by substituting them with a functional group-containing compound such as an acid compound), fluorine compounds (such as fluorine oils typified by polyfluoroalkyl ethers), and paraffin waxes and beeswax. Out of these, saturated aliphatic acid esters, linear and cyclic polydimethylsiloxane oils, polymethylphenyl silicone oils and fluorine oils are preferred. The amount of the release agent is preferably 0.01 to 0.3 part by weight based on 100 parts by weight of the total of the resin components (A).

The release agent is preferably a saturated aliphatic acid ester such as a monoglyceride such as monoglyceride stearate, polyglycerin aliphatic acid ester such as decaglycerin decastearate or decaglycerin tetrastearate, lower fatty acid ester such as stearyl stearate, higher fatty acid ester such as behenyl sebacate, or erithritol ester such as pentaerythritol tetrastearate.

Since the resin composition of the present invention is often used in housings for OA equipment, it preferably contains an ultraviolet light absorber. The ultraviolet light absorber may be a benzophenone-based ultraviolet light absorber typified by 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodium sulfoxybenzophenone and bis(5-benzoyl-4-hydroxy-2-methoxyphenyl)methane.

The ultraviolet light absorber may be a benzotriazole-based ultraviolet light absorber typified by 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl) phenylbenzotriazole, 2-[2'-hydroxy-3'-(3",4",5',6"-tetraphthalimidemethyl)-5'-methylphenyl] benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2,2'-methylenebis[4-(1,1,3,3-tetramethylbutyl)-6-(2H-benzotriazole-2-yl) phenol] and condensate of methyl-3-[3-tert-butyl-5-(2H-benzotriazole-2-yl)-4-hydroxyphenylpropionate and polyethylene glycol.

The ultraviolet light absorber may also be a hydroxyphenyltriazine-based compound such as 2-(4,6-diphenyl-1,3,5-triazine-2-yl)-5-hexyloxy-phenol and 2-(4,6-bis-(2,4-dimethylphenyl-1,3,5-triazine-2-yl)-5-hexyloxy-phenol.

A light stabilizer may also be mixed with the resin composition of the present invention. The light stabilizer may be a hindered amine-based light stabilizer typified by bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-tert-butyl-4-hydroxybenzyl)-2n-butyl malonate, condensate of 1,2,3,4-butanecarboxylic acid, 2,2,6,6-tetramethyl-4-piperidinol and tridecyl alcohol, condensate of 1,2,3,4-butanedicarboxylic acid, 1,2,2,6,6-pentamethyl-4-piperidinol and tridecyl alcohol, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, poly{[6-(1,1,3,3-tetramethylbutyl)amino-1,3,5-triazine-2,4-diyl][(2,2,6,6-tetramethylpiperidyl) imino] hexamethylene[(2,2,6,6-tetramethylpiperidyl)imino] }, poly{[6-morpholino-s-triazine-2,4-diyl][(2,2,6,6-tetramethylpiperidyl)imino]hexamethylene[(2,2,6,6-tetramethylpiperidyl)imino]}, condensate of 1,2,3,4-butanetetracarboxylic acid, 2,2,6,6-tetramethyl-4-piperidinol and β,β,β',β'-tetramethyl-3,9-(2,4,8,10-tetraoxaspiro[5,5] undecane)diethanol, condensate of N,N'-bis(3-aminopropyl)ethylenediamine and 2,4-bis[N-butyl-N-(1,2,2,6,6-pentamethyl-4-piperidyl) amino]chloro-1,3,5-triazine, condensate of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5] undecane) diethanol, and polymethylpropyl 3-oxy-[4-(2,2,6,6-tetramethyl)piperidinyl]siloxane.

The amounts of the above ultraviolet light absorber and the light stabilizer are each preferably 0.01 to 5 parts by weight, more preferably 0.02 to 1 part by weight based on 100 parts by weight of the total of the resin components (A).

A bluing agent may be mixed with the resin composition of the present invention to eliminate a yellow tint derived from the ultraviolet light absorber or the like. Any bluing agent may be accepted if it can be used for a polycarbonate resin. An anthraquinone-based dye is easily acquired and preferred. Examples of the bluing agent include Solvent violet 13 [CA. No. (color index No.) 60725; Macrolex Violet B of Bayer AG, Diaresin Blue G of Mitsubishi Chemical Corporation, Sumiplast Violet B of Sumitomo Chemical Co., Ltd.], Solvent Violet 31 [CA. No 68210; Diaresin Violet D of Mitsubishi Chemical Corporation], Solvent Violet 33 [CA. No 60725; Diaresin Blue J of Mitsubishi Chemical Corporation], Solvent Blue 94 [CA. No 61500; Diaresin Blue N of Mitsubishi Chemical Corporation], Solvent Violet 36 [CA. No 68210; Macrolex Violet 3R of Bayer AG], Solvent Blue 97 [Macrolex Blue RR of Bayer AG], and Solvent Blue 45 [CA. No 61110; Telasol Blue RLS of Sandoz Ltd.]. Out of these, Macrolex Blue RR, Macrolex Violet B and Telasol Blue RLS are particularly preferred.

The resin composition of the present invention has excellent dripping preventing properties. However, an ordinary dripping preventing agent may be used to further improve the above properties. In a transparent resin composition according to a preferred embodiment of the present invention, the amount of the dripping preventing agent is suitably 0.1 part or less by weight, preferably 0.08 part or less by weight, more preferably 0.05 part or less by weight based on 100 parts by weight of the component A in order not to impair the transparency of the composition. The dripping preventing agent is, for example, a fluorine-containing polymer having fibril forming capability. Polytetrafluoroethylene (may be abbreviated as PTFE hereinafter) is particularly preferred.

PTFE having fibril forming capability has an extremely high molecular weight and tends to become fibrous by bonding to another PTFE by an external action such as shearing force. The number average molecular weight of PTFE which is obtained from standard specific gravity is preferably 1,000,000 to 10,000,000, more preferably 2,000,000 to 9,000,000. PTFE may be used as a solid or an aqueous dispersion. PTFE having fibril forming capability may be mixed with another resin to improve its dispersibility in a resin and to obtain excellent flame retardancy and transparency. Commercially available products of the mixture of PTFE include the Metablen A3000 of Mitsubishi Rayon Co., Ltd. and the BLENDEX B449 of GE Specialty Chemicals.

To produce the resin composition of the present invention, any method is employed. For example, the components A and B and other optional components are completely mixed together using pre-mixing means such as a V-shaped mixer, Henschel mixer, mechanochemical device or extrusion-type mixer, the resulting mixture is granulated by an extrusion granulator or briquetting machine as required, and the obtained mixture is melt kneaded by a melt kneader typified by a vented twin-screw extruder and pelletized by a device such as a pelletizer.

Alternative methods include one in which the components A and B and other optional components are each independently supplied into a melt kneader typified by a vented twin-screw extruder, one in which the component A and some of other components are pre-mixed together and then the obtained mixture is supplied into a melt kneader independently of the rest of the components, and one in which the component B is diluted with water or an organic solvent and supplied into a melt kneader or the diluted mixture is pre-mixed with other components and supplied into a melt extruder. When components to be mixed together include a liquid component, a so-called liquid injector or liquid adder may be used to supply the liquid component into the melt kneader.

Molded articles can be generally produced by injection molding pellets of the resin composition of the present invention. In injection molding, not only an ordinary cold runner but also a hot runner which makes it possible to eliminate the need of runners may be used to produce the molded articles. Injection molding may be ordinary molding, gas assist injection molding, injection compression molding, ultra high-speed injection molding, injection press molding, two-color molding, sandwich molding, in-mold coating molding, insert molding, foam molding (including what uses a super critical fluid), rapid heating/cooling mold molding, heat insulating mold molding, in-mold re-melt molding or a combination thereof.

The resin composition of the present invention can be formed into various extrusion molded articles such as sheets, films or profiles. To form a sheet or film, an inflation or casting method may also be used. It can be formed into a heat-shrinkable tubing by specific stretching operation. Molded articles can be obtained from the resin composition of the present invention by rotational molding without melt kneading it.

Molded articles formed from the resin composition may be surface treated. The surface treatment may be decorative coating, hard coating, water-repellent/oil-repellent coating, hydrophilic coating, ultraviolet absorption coating, infrared absorption coating, electromagnetic wave absorption coating, heat-generating coating, antistatic coating, controlled low conductive coating, conductive coating or metallizing (plating, chemical vapor deposition (CVD), physical vapor deposition (PVD), thermal spraying). A transparent sheet coated with a transparent conductive layer is preferred.

Effect of the Invention

The flame retardant aromatic polycarbonate resin composition of the present invention comprises a silicone compound (component B) as a flame retardant, has excellent dripping preventing properties and is excellent in dyeing properties at the time of coloring and the clarity of a character or mark printed by laser marking. These characteristic properties could not be achieved in flame retardant aromatic polycarbonate resin compositions of the prior art. The above resin composition has high thermal stability at the time of melting at a high temperature such as injection molding. Therefore, it is extremely useful in various industrial fields such as OA equipment and electric and electronic appliances.

According to a preferred aspect of the present invention, there is provided a flame retardant aromatic polycarbonate resin composition having excellent transparency. Since this flame retardant resin composition comprise a specific silicone compound (component B) as a flame retardant, it has dripping preventing properties, transparency and resistance to moist heat. The flame retardant resin composition having the above characteristic properties was not found among polycarbonate resin compositions of the prior art. The resin composition having excellent transparency can be molded into a transparent sheet and is useful for applications such as lighting covers, protective covers for transmission type displays, light guide parts, covers and substrates of solar cell, lenses, lens arrays, couplers, touch panels, resin windows, game machine parts (such as the front cover of "Pachinko", circuit covers thereof, etc.), prisms and mirrors. That is, it is extremely useful for various industrial fields such as OA equipment, electric and electronic appliances, automobiles, agriculture, fishery, and civil engineering and construction.

EXAMPLES

The following examples are provided for the purpose of further illustrating the present invention but are in no way to be taken as limiting. The following items were evaluated.
(1) Characteristic Properties of Materials
(1-I) Dripping Preventing Properties A UL standard 94 test was made on a 1.6 mm-thick test sample prepared based on UL standards. At this point, the times from primary ignition and from secondary ignition to dripping were measured and the dripping preventing properties were evaluated based on the shortest time (seconds).
(1-II) Dyeing Properties A 150 mm square board-like molded article having a thickness of 2.0 mm was divided into 9 pieces and the L values of the 9 pieces were measured by the TCM-1800 color computer of Tokyo Denshoku Co., Ltd. The value (ΔL) obtained by subtracting the smallest L value from the largest L value of 9 pieces and the visually inspected appearance of the molded article were evaluated based on the following criteria.

○: satisfactory; no peeling, glossy, good color and uniform appearance

X: unsatisfactory; peeling, not glossy, bad color or nonuniform appearance (1-III) Laser Marking Properties A 2.0 mm-thick test sample prepared based on UL standards was marked by the SL475E laser marker of NEC Corporation at a scanning speed of 100 mm/sec and a bite size of 30 µm and the minimum current value at which marking was possible and the visually inspected clarity of a mark were evaluated based on the following criteria.

○: satisfactory, clearly recognizable character
X: unsatisfactory, blurred character (1-IV) Transparency The transparency of a 150 mm square board-like molded article having a thickness of 2.0 mm was evaluated based on the haze value measured in accordance with JIS K7105 and the visually inspected color of the molded article.

(1-V) Resistance to Moist Heat

After the square board-like molded article used for the measurement (1-IV) was left at a temperature of 65° C. and a humidity of 85% for 500 hours, the haze value of the molded article was measured in accordance with JIS K7105. The difference (ΔH) between the obtained haze value and the initial haze value was obtained and the color of the molded article after the above moist heat treatment was evaluated visually (the term "cloudy" means that light transmission can be confirmed visually. The term "opaque" means that light transmission cannot be confirmed visually and the haze was not measured in this case).

Examples 1 to 25 and Comparative
Examples 1 to 18

Resin compositions shown in Tables 1 to 9 were prepared by the following procedure. Symbols in these tables are used in the following description.

The amounts of components shown in Table 1 to 9 were weighed, 0.01 part by weight of a phosphite-based antioxidant (IRGAFOS168 of Nippon Ciba Geigy Co., Ltd.), 0.01 part by weight of a phenol-based antioxidant (IRGANOX1076 of Nippon Ciba Geigy Co., Ltd.), 0.3 part by weight of an ultraviolet light absorber (Chemisorb 79 of CHEMIPRO KASEI KAISHA, LTD.) and 0.3 part by weight of a release agent (Rikemal SL900 of Riken Vitamin Co., Ltd.) were weighed, they were uniformly mixed together by a tumbler, and the resulting mixture was supplied into an extruder to produce resin compositions.

The extruder was a 30 mm-diameter vented twin-screw extruder (KTX-30 of Kobe Steel, Ltd.). As for screw constitution, a first kneading zone (consisting of 2 feed kneading disks, 1 feed rotor, 1 return rotor and 1 return kneading disk) was formed before the position of a vent and a second kneading zone (consisting of 1 feed rotor and 1 return rotor) was formed after the position of the vent. A strand was extruded at a cylinder temperature and a die temperature of 280° C. and a vent suction degree of 3,000 Pa, cooled in a water bath and cut by a pelletizer to be pelletized.

The obtained pellets were dried by a hot air circulating drying machine at 110° C. for 5 hours and a test sample was molded from the pellets by an injection molding machine [T-150D of FANUC Ltd.] at a cylinder temperature of 290° C. and a mold temperature of 70° C.

The used raw materials represented by symbols in Tables 1 to 9 are given below (the symbols represent the same raw materials in other tables).
Components (A)
(Component A-1)
PC-1: linear polycarbonate resin (aromatic polycarbonate resin comprising bisphenol A and p-tert-butylphenol as a terminal capping agent and prepared by a phosgene method. This aromatic polycarbonate resin was produced without using an amine-based catalyst, contained 10 mol % of a terminal hydroxyl group based on the total of all the terminal groups and 25 ppm of a phosphonite-based antioxidant [Sandstab P-EPQ of Clariant K.K.] and had a viscosity average molecular weight of 22,500.)

PC-2: branched aromatic polycarbonate resin (Toughlon IB2500 of Idemitsu Petrochemical Co., Ltd.)

PC-3: polycarbonate resin having a viscosity average molecular weight of 15,500 produced by reacting bisphenol A, p-tert-butylphenol as a terminal capping agent and phosgene in the presence of methylene chloride, a 10% aqueous solution of sodium hydroxide and triethylamine in accordance with a commonly used method under the condition that the molar ratio of p-tert-butylphenol to bisphenol A was 0.058

PC-4: polycarbonate resin having a viscosity average molecular weight of 121,000 produced by reacting bisphenol A, p-tert-butylphenol as a terminal capping agent and phosgene in the presence of methylene chloride, a 10% aqueous solution of sodium hydroxide and triethylamine in accordance with a commonly used method under the condition that the molar ratio of p-tert-butylphenol to bisphenol A was 0.0004

(Component A-2)
ABS: styrene-butadiene-acrylonitrile copolymer (Santac UT-61 of Nippon A&L Inc.)
AS: styrene-acrylonitrile copolymer (Stylac-AS 767 R27 of Asahi Kasei Corporation)
MBS: methyl methacrylate-butadiene-styrene copolymer (Kane-Ace B-56 of Kaneka Corporation)

(Component A-3)
PET: polyethylene terephthalate resin (TR-8580 of Teijin Limited having an intrinsic viscosity of 0.8)
PBT: polybutylene terephthalate resin (TRB-H of Teijin Limited having an intrinsic viscosity of 1.07)
Component B Synthesis Example-1

15.9 g of hexamethyldisiloxane, 147.3 g of 1,3,5,7-tetramethylcyclotetrasiloxane, 14.5 g of octamethylcyclotetrasiloxane and 395.1 g of diphenyl dimethoxysilane were fed to a 1-liter flask equipped with a stirrer, cooler and thermometer and further 25.0 g of concentrated sulfuric acid was added under agitation. After the inside temperature of the flask was reduced to 10° C., 29.7 g of water was added dropwise to the flask in 30 minutes under agitation. During this, cooling was continued to keep the inside temperature at 20° C. or lower. After addition, stirring was continued at an inside temperature of 10 to 20° C. for 5 hours for aging, 8.5 g of water and 300 g of toluene were added and stirred for 30 minutes, and a water layer separated by standing was removed. Thereafter, the residue was washed with a 5% aqueous solution of sodium sulfate four times and it was confirmed that the toluene layer became neutral. This toluene solution was heated at an inside temperature of up to 120° C. under reduced pressure to remove toluene and low-boiling matter, and the undissolved product was removed by filtration to obtain a silicone compound B-1.

Synthesis Example-2

538.2 g of water and 120 g of toluene were fed to a 1-liter flask equipped with a stirrer, cooler and thermometer and cooled to an inside temperature of 5° C. A mixture of 22.6 g of trimethylchlorosilane, 119.6 g of methyldichlorosilane and 34.2 g of diphenyldichlorosilane was fed to a dropping funnel and added dropwise to the flask in 2 hours under agitation. During this, cooling was continued to keep the inside temperature at 20° C. or lower. After addition, stirring was continued at an inside temperature of 20° C. for 4 hours for aging, a hydrochloric acid water layer separated by standing was removed, a 10% aqueous solution of sodium carbonate was added and stirred for 5 minutes, and a water layer separated by standing was removed. Thereafter, the residue was washed with ion exchange water three times and it was confirmed that the toluene layer became neutral. This toluene solution was heated at an inside temperature of up to 120° C. under reduced pressure to remove toluene and low-boiling matter, and the undissolved product was removed by filtration to obtain a silicone compound B-2.

Synthesis Example-3

A silicone compound B-3 was obtained in the same manner as in Synthesis Example-2 except that 452.8 g of water and 120 g of toluene were fed to the flask and a mixture of 21.7 g of trimethylchlorosilane, 23.0 g of methyldichlorosilane, 80.0 g of dimethyldichlorosilane and 32.9 g of diphenyldichlorosilane was added dropwise.

Synthesis Example-4

A silicone compound B-4 was obtained in the same manner as in Synthesis Example-1 except that 100.7 g of 1,1,3,3-tetramethyldisiloxane, 60.1 g of 1,3,5,7-tetramethylcyclotetrasiloxane, 129.8 g of octamethylcyclotetrasiloxane, 143.8 g of octaphenylcyclotetrasiloxane and 99.1 g of phenyltrimethoxysilane were fed to the flask, 25.0 g of concentrated sulfuric acid was added, and 13.8 g of water was added dropwise.

Synthesis Example-5

A silicone compound B-5 was obtained in the same manner as in Synthesis Example-2 except that 454.9 g of water and 140 g of toluene were fed to the flask, and a mixture of 47.3 g of dimethylchlorosilane, 34.5 g of methyldichlorosilane, 1.4 g of dimethyldichlorosilane, 11.3 g of diphenyldichlorosilane and 63.5 g of phenyltrichlorosilane was added dropwise.

Synthesis Example-6

A silicone compound B-6 was obtained in the same manner as in Synthesis Example-1 except that 26.0 g of hexamethyldisiloxane, 57.7 g of 1,3,5,7-tetramethylcyclotetrasiloxane, 26.1 g of octamethylcyclotetrasiloxane and 456.3 g of diphenyldimethoxysilane were fed to the flask, 25.0 g of concentrated sulfuric acid was added, and 34.3 g of water was added dropwise.

Synthesis Example-7

A silicone compound B-7 was obtained in the same manner as in Synthesis Example-1 except that 81.2 g of hexamethyldisiloxane, 30.1 g of 1,3,5,7-tetramethylcyclotetrasiloxane, 129.8 g of octamethylcyclotetrasiloxane and 317.7 g of diphenyldimethoxysilane were fed to the flask, 25.0 g of concentrated sulfuric acid was added, and 23.9 g of water was added dropwise.

Synthesis Example-8

A silicone compound B-8 was obtained in the same manner as in Synthesis Example-2 except that 511.3 g of water and 120 g of toluene were fed to the flask, and a mixture of 14.8 g of dimethylchlorosilane, 17.9 g of methyldichlorosilane, 112.7 g of dimethyldichlorosilane and 19.7 g of diphenyldichlorosilane was added dropwise.

Synthesis Example-9

A silicone compound B-9 was obtained in the same manner as in Synthesis Example-1 except that 6.7 g of 1,1,3,3-tetramethyldisiloxane, 60.1 g of 1,3,5,7-tetramethylcyclotetrasiloxane and 533.9 g of diphenyldimethoxysilane were fed to the flask, 40.0 g of concentrated sulfuric acid was added, and 40.2 g of water was added dropwise.

B-1: silicone compound having an Si—H content of 0.49 mol/100 g, an aromatic group content of 50 wt % and a refractive index of 1.5313 prepared in Synthesis Example-1

B-2: silicone compound having an Si—H content of 1.00 mol/100 g, an aromatic group content of 20 wt % and a refractive index of 1.4480 prepared in Synthesis Example-2

B-3: silicone compound having an Si—H content of 0.20 mol/100 g, an aromatic group content of 20 wt % and a refractive index of 1.4502 prepared in Synthesis Example-3

B-4: silicone compound having an Si—H content of 0.50 mol/100 g, an aromatic group content of 30 wt % and a refractive index of 1.4750 prepared in Synthesis Example-4

B-5: silicone compound having an Si—H content of 0.80 mol/100 g, an aromatic group content of 30 wt % and a refractive index of 1.4770 prepared in Synthesis Example-5

B-6: silicone compound having an Si—H content of 0.20 mol/100 g, an aromatic group content of 60 wt % and a refractive index of 1.5583 prepared in Synthesis Example-6

B-7: silicone compound having an Si—H content of 0.10 mol/100 g, an aromatic group content of 40 wt % and a refractive index of 1.4970 prepared in Synthesis Example-7

B-8: silicone compound having an Si—H content of 0.31 mol/100 g, an aromatic group content of 12 wt % and a refractive index of 1.4188 prepared in Synthesis Example-8

B-9: silicone compound having an Si—H content of 0.22 mol/100 g, an aromatic group content of 67 wt % and a refractive index of 1.5839 prepared in Synthesis Example-9

Other Components B

Synthesis Example-10

A silicone compound B-10 was obtained in the same manner as in Synthesis Example-1 except that 97.4 g of hexamethyldisiloxane, 180.4 g of 1,3,5,7-tetramethylcyclotetrasiloxane and 222.5 g of octamethylcyclotetrasiloxane were fed to the flask, 25.0 g of concentrated sulfuric acid was added, and water was not added dropwise.

Synthesis Example-11

A silicone compound B-11 was obtained in the same manner as in Synthesis Example-1 except that 39.9 g of hexamethyldisiloxane, 14.8 g of 1,3,5,7-tetramethylcyclotetrasiloxane, 200.6 g of octamethylcyclotetrasiloxane and 300.6 g of diphenyldimethoxysilane were fed to the flask, 25.0 g of concentrated sulfuric acid was added, and 22.6 g of water was added dropwise.

Synthesis Example-12

A silicone compound B-12 was obtained in the same manner as in Synthesis Example-2 except that 560.6 g of water and 140 g of toluene were fed to the flask, and a mixture of 18.9 g of dimethylchlorosilane, 126.5 g of methyldichlorosilane and 25.3 g of diphenyldichlorosilane was added dropwise.

B-10 (comparison): silicone compound having an Si—H content of 0.60 mol/100 g, an aromatic group content of 0 wt % and a refractive index of 1.3956 prepared in Synthesis Example-10

B-11 (comparison): silicone compound having an Si—H content of 0.05 mol/100 g, an aromatic group content of 38 wt % and a refractive index of 1.4915 prepared in Synthesis Example-11

B-12 (comparison): silicone compound having an Si—H content of 1.31 mol/100 g, an aromatic group content of 16 wt % and a refractive index of 1.4419 prepared in Synthesis Example-12

<Rational Formula of Each Silicone Compound>

B-1: $M_2 D^H{}_{25} D_2 D^{\Phi 2}{}_{16.5}$
B-2: $M_2 D^H{}_{10} D^{\Phi 2}{}_{1.3}$
B-3: $M_2 D^H{}_2 D_{6.2} D^{\Phi 2}{}_{1.3}$
B-4: $M^H{}_3 D^H{}_2 D_{3.5} D^{\Phi 2}{}_{1.45} T^\Phi{}_1$
B-5: $M^H{}_5 D^H{}_3 D_{0.107} D^{\Phi 2}{}_{0.445} T^\Phi{}_3$
B-6: $M_2 D^H{}_6 D_{2.2} D^{\Phi 2}{}_{11.67}$
B-7: $M_2 D^H{}_1 D_{3.5} D^{\Phi 2}{}_{2.6}$
B-8: $M^H{}_2 D^H{}_2 D_{11.2} D^{\Phi 2}{}_1$
B-9: $M^H{}_2 D^H{}_{20} D^{\Phi 2}{}_{43.7}$
B-10: $M_2 D^H{}_5 D_5$ (comparison)
B-11: $M_2 D^H{}_1 D_{11} D^{\Phi 2}{}_1$ (comparison)
B-12: $M^H{}_2 D^H{}_{11} D^{\Phi 2}{}_1$ (comparison)

The symbols in the above rational formulas represent the following respective siloxane units and the coefficient of each symbol represents the polymerization degree of a siloxane unit per one molecule.

M: $(CH_3)_3 SiO_{1/2}$
$M^H$: $H(CH_3)_2 SiO_{1/2}$
D: $(CH_3)_2 SiO$
$D^H$: $H(CH_3)SiO$
$D^{\Phi 2}$: $(C_6 H_5)_2 SiO$
$T^\Phi$: $(C_6 H_5) SiO_{3/2}$

Component C

C-1: 2,3-dimethyl-2,3-diphenylbutane (so-called dicumyl, Nofmer BC of NOF Corporation)

C-2: potassium salt of perfluorobutanesulfonic acid (Megafac F-114P of Dainippon Ink & Chemicals, Incorporated.)

C-3: potassium salt of diphenylsulfonesulfonic acid (KSS of UCB Japan Co., Ltd.)

TABLE 1

| | | Unit | Ex. 1 | Ex. 2 | Ex. 3 | Ex. 4 | Ex. 5 |
|---|---|---|---|---|---|---|---|
| Components A | PC-1 | pbw | 100 | | 70 | 80 | 97 |
| | PC-2 | pbw | | 100 | | | |
| | ABS | pbw | | | 30 | | |
| | AS | pbw | | | | 20 | |
| | MBS | pbw | | | | | 3 |
| Component B | B-4 | pbw | 2 | 2 | 2 | 2 | 2 |
| Time elapsed until dripping | after primary ignition | sec | no dripping | no dripping | no dripping | no dripping | no dripping |
| | after secondary ignition | sec | 8 | 15 | 6 | 6 | 8 |
| Dyeing properties | brightness | — | ○ | ○ | ○ | ○ | ○ |
| | ΔL | — | 0.1 | 0.1 | 0.1 | 0.1 | 0.1 |
| Laser marking properties | clarity | — | ○ | ○ | ○ | ○ | ○ |
| | Current value | A | 19.0 | 19.3 | 19.5 | 19.0 | 19.2 |
| Transparency | Color | — | achromatic and transparent | achromatic and transparent | opaque | opaque | opaque |
| | haze | — | 1.1 | 1.1 | — | — | — |

Ex.: Example
pbw: parts by weight

TABLE 2

| | | Unit | Ex. 6 | Ex. 7 | Ex. 8 | Ex. 9 | Ex. 10 |
|---|---|---|---|---|---|---|---|
| Components A | PC-1 | pbw | 90 | 90 | 100 | 100 | 100 |
| | PET | pbw | 10 | | | | |
| | PBT | pbw | | 10 | | | |
| Components B | B-1 | pbw | | | 2 | | |
| | B-2 | pbw | | | | 2 | |
| | B-3 | pbw | | | | | 2 |
| | B-4 | pbw | 2 | 2 | | | |
| Time elapsed until dripping | after primary ignition | sec | no dripping | no dripping | no dripping | no dripping | no dripping |
| | after secondary ignition | sec | 7 | 7 | 10 | 14 | 6 |
| Dyeing properties | brightness | — | ○ | ○ | ○ | ○ | ○ |
| | ΔL | — | 0.1 | 0.1 | 0.1 | 0.5 | 0.4 |
| Laser marking properties | clarity | — | ○ | ○ | ○ | ○ | ○ |
| | Current value | A | 19.6 | 19.4 | 19.2 | 18.8 | 19.6 |

TABLE 2-continued

|  |  | Unit | Ex. 6 | Ex. 7 | Ex. 8 | Ex. 9 | Ex. 10 |
|---|---|---|---|---|---|---|---|
| Transparency | Color | — | opaque | opaque | achromatic and transparent | achromatic and transparent | achromatic and transparent |
|  | haze | — | — | — | 1.6 | 1.6 | 1.6 |

Ex.: Example
pbw: parts by weight

TABLE 3

|  |  | Unit | Ex. 11 | Ex. 12 | Ex. 13 | Ex. 14 | Ex. 15 | Ex. 16 |
|---|---|---|---|---|---|---|---|---|
| Component A | PC-1 | pbw | 100 | 100 | 100 | 100 | 100 | 100 |
| Components B | B-4 | pbw |  |  | 1 | 3 | 5 | 2 |
|  | B-5 | pbw | 2 |  | 1 |  |  |  |
|  | B-6 | pbw |  | 2 |  |  |  |  |
| Component C | C-1 | pbw |  |  |  |  |  | 0.1 |
| Time elapsed until dripping | after primary ignition | sec | no dripping | no dripping | no dripping | no dripping | no dripping | no dripping |
|  | after secondary ignition | sec | 11 | 9 | 10 | 15 | 17 | no dripping |
| Dyeing properties | brightness | — | ○ | ○ | ○ | ○ | ○ | ○ |
|  | ΔL | — | 0.1 | 0.1 | 0.1 | 0.1 | 0.1 | 0.1 |
| Laser marking properties | clarity | — | ○ | ○ | ○ | ○ | ○ | ○ |
|  | Current value | A | 19.0 | 19.2 | 19.5 | 19.0 | 18.5 | 19.6 |
| Transparency | Color | — | achromatic and transparent | achromatic and transparent | achromatic and transparent | achromatic and transparent | achromatic and transparent | achromatic and transparent |
|  | haze | — | 1.3 | 0.8 | 1.1 | 1.2 | 1.3 | 1.2 |

Ex.: Example
pbw: parts by weight

TABLE 4

|  |  | Unit | Ex. 17 | Ex. 18 | Ex. 19 | Ex. 20 | Ex. 21 | Ex. 22 |
|---|---|---|---|---|---|---|---|---|
| Components A | PC-1 | pbw | 100 | 100 | 100 | 100 |  |  |
|  | PC-2 | pbw |  |  |  |  | 80 |  |
|  | PC-3 | pbw |  |  |  |  | 20 | 85 |
|  | PC-4 | pbw |  |  |  |  |  | 15 |
| Components B | B-4 | pbw | 2 | 1 | 2 |  | 1 | 1 |
|  | B-5 | pbw |  |  |  | 1 |  |  |
| Components C | C-2 | pbw | 0.1 | 0.1 |  | 0.1 | 0.1 | 0.1 |
|  | C-3 | pbw |  |  | 0.1 |  |  |  |
| Time elapsed until dripping | after primary ignition | sec | no dripping | no dripping | no dripping | no dripping | no dripping | no dripping |
|  | after secondary ignition | sec | no dripping | no dripping | no dripping | no dripping | no dripping | no dripping |
| Dyeing properties | brightness | — | ○ | ○ | ○ | ○ | ○ | ○ |
|  | ΔL | — | 0.1 | 0.1 | 0.5 | 0.4 | 0.1 | 0.1 |
| Laser marking properties | clarity | — | ○ | ○ | ○ | ○ | ○ | ○ |
|  | Current value | A | 19.4 | 19.8 | 19.4 | 19.3 | 19.2 | 19.2 |
| Transparency | Color | — | achromatic and transparent | achromatic and transparent | achromatic and transparent | achromatic and transparent | achromatic and transparent | achromatic and transparent |
|  | haze | — | 2.8 | 1.9 | 1.1 | 2.8 | 1.9 | 1.9 |

Ex.: Example
pbw: parts by weight

TABLE 5

|  |  | Unit | C. Ex. 1 | C. Ex. 2 | C. Ex. 3 | C. Ex. 4 | C. Ex. 5 |
|---|---|---|---|---|---|---|---|
| Components A | PC-1 | pbw | 100 |  | 70 | 80 | 97 |
|  | PC-2 | pbw |  | 100 |  |  |  |
|  | ABS | pbw |  |  | 30 |  |  |
|  | AS | pbw |  |  |  | 20 |  |
|  | MBS | pbw |  |  |  |  | 3 |
| Other Component B | B-12 | pbw | 2 | 2 | 2 | 2 | 2 |
| Time elapsed until dripping | after primary ignition | sec | no dripping | no dripping | no dripping | no dripping | no dripping |
|  | after secondary ignition | sec | 13 | 20 | 11 | 9 | 14 |
| Dyeing properties | brightness | — | ○ | ○ | ○ | ○ | ○ |
|  | ΔL | — | 0.1 | 0.1 | 0.1 | 0.1 | 0.1 |
| Laser marking properties | clarity | — | X | X | X | X | X |
|  | Current value | A | 18.8 | 19.0 | 18.9 | 18.8 | 19.0 |

TABLE 5-continued

|  |  | Unit | C. Ex. 1 | C. Ex. 2 | C. Ex. 3 | C. Ex. 4 | C. Ex. 5 |
|---|---|---|---|---|---|---|---|
| Transparency | Color | — | achromatic and transparent | achromatic and transparent | opaque | opaque | opaque |
|  | haze | — | 1.8 | 1.8 | — | — | — |

C. Ex.: Comparative Example
pbw: parts by weight

TABLE 6

|  |  | Unit | C. Ex. 6 | C. Ex. 7 | C. Ex. 8 | C. Ex. 9 |
|---|---|---|---|---|---|---|
| Components A | PC-1 | pbw | 90 | 90 | 100 | 100 |
|  | PET | pbw | 10 |  |  |  |
|  | PBT | pbw |  | 10 |  |  |
|  | Total (A) | pbw | 100 | 100 | 100 | 100 |
| Other Components B | B-10 | pbw |  |  | 2 |  |
|  | B-11 | pbw |  |  |  | 2 |
|  | B-12 | pbw | 2 | 2 |  |  |
|  | Total (B) | pbw | 2 | 2 | 2 | 2 |
| Time elapsed until dripping | after primary ignition | sec | no dripping | no dripping | no dripping | 1 |
|  | after secondary ignition | sec | 10 | 9 | 9 | 1 |
| Dyeing properties | brightness | — | ○ | ○ | X | ○ |
|  | ΔL | — | 0.1 | 0.1 | 3.8 | 0.1 |
| Laser marking properties | clarity | — | X | X | X | X |
|  | Current value | A | 19.1 | 19.2 | 19.2 | 22.0 |
| Transparency | Color | — | opaque | opaque | cloudy | achromatic and transparent |
|  | haze | — | — | — | 61.0 | 1.1 |

C. Ex.: Comparative Example
pbw: parts by weight

TABLE 7

|  |  | Unit | C. Ex. 10 | C. Ex. 11 | C. Ex. 12 | C. Ex. 13 |
|---|---|---|---|---|---|---|
| Component A | PC-1 | pbw | 100 | 100 | 100 | 100 |
| Component B | B-4 | pbw |  |  | 0.05 | 15 |
| Other Component B | B-12 | pbw | 5 |  |  |  |
| Time elapsed until dripping | after primary ignition | sec | no dripping | 2 | no dripping | 1 |
|  | after secondary ignition | sec | 28 | 1 | 36 | 1 |
| Dyeing properties | brightness | — | ○ | ○ | ○ | ○ |
|  | ΔL | — | 0.1 | 0.1 | 0.1 | 0.1 |
| Laser marking properties | clarity | — | X | X | X | X |
|  | Current value | A | 18.1 | 21.9 | 18.0 | 22.2 |
| Transparency | Color | — | achromatic and transparent | achromatic and transparent | achromatic and transparent | achromatic and transparent |
|  | haze | — | 9.9 | 0.4 | 6.5 | 0.3 |

C. Ex.: Comparative Example
pbw: parts by weight

TABLE 8

|  |  | Unit | C. Ex. 14 | C. Ex. 15 | C. Ex. 16 | C. Ex. 17 | C. Ex. 18 |
|---|---|---|---|---|---|---|---|
| Components A | PC-1 | pbw | 70 | 97 | 90 | 30 | 40 |
|  | ABS | pbw | 30 |  |  | 70 |  |
|  | MBS | pbw |  | 3 |  |  |  |
|  | PET | pbw |  |  | 10 |  | 60 |
| Component B | B-4 | pbw |  |  |  | 2 | 2 |
| Time elapsed until dripping | after primary ignition | sec | 1 | 1 | 1 | 3 | 2 |
|  | after secondary ignition | sec | 1 | 1 | 1 | 1 | 1 |
| Dyeing properties | brightness | — | ○ | ○ | ○ | ○ | ○ |
|  | ΔL | — | 0.1 | 0.1 | 0.1 | 0.1 | 0.1 |

TABLE 8-continued

|  |  | Unit | C. Ex. 14 | C. Ex. 15 | C. Ex. 16 | C. Ex. 17 | C. Ex. 18 |
|---|---|---|---|---|---|---|---|
| Laser marking properties | clarity | — | X | X | X | ◯ | ◯ |
|  | Current value | A | 21.7 | 22.2 | 22.3 | 18.8 | 19.0 |
| Transparency | Color | — | opaque | opaque | opaque | opaque | opaque |
|  | haze | — | — | — | — | — | — |

C. Ex.: Comparative Example
pbw: parts by weight

TABLE 9

|  |  | Unit | Ex. 23 | Ex. 24 | Ex. 25 |
|---|---|---|---|---|---|
| Component A | PC-1 | pbw | 100 | 100 | 100 |
| Components B | B-7 | pbw | 2 |  |  |
|  | B-8 | pbw |  | 2 | 1 |
|  | B-9 | pbw |  |  | 2 |
| Component C | C-2 | pbw | 0.1 | 0.1 | 0.1 |
| Time elapsed until dripping | after primary ignition | sec | no dripping | no dripping | no dripping |
|  | after secondary ignition | sec | no dripping | no dripping | no dripping |
| Dyeing properties | brightness | — | ◯ | ◯ | ◯ |
|  | ΔL | — | 0.1 | 0.1 | 0.1 |
| Laser marking properties | clarity | — | ◯ | ◯ | ◯ |
|  | Current value | A | 19.4 | 19.4 | 19.4 |
| Transparency | Color | — | achromatic and transparent | achromatic and transparent | achromatic and transparent |
|  | haze | — | 2.3 | 2.8 | 3.1 |

Ex.: Example
pbw: parts by weight

Examples 26 to 38 and
Comparative Examples 19 to 24

Resin compositions were prepared and test samples were molded in the same manner as in Example 1 by weighing the amounts of components shown in Tables 10 to 14 and the same amounts of the same other components as in Example 1 and not shown in the tables.

The used raw materials shown in Tables 10 to 14 are given below.
Component B

Synthesis Exmaple-13

A silicone compound B-13 was obtained in the same manner as in Synthesis Example-2 except that 301.9 g of water and 150 g of toluene were fed to the flask, and a mixture of 21.7 g of trimethylchlorosilane, 23.0 g of methyldichlorosilane, 12.9 g of dimethyldichlorosilane and 76.0 g of diphenyldichlorosilane was added dropwise.

Synthesis Example-14

A silicone compound B-14 was obtained in the same manner as in Synthesis Example-1 except that 16.2 g of hexamethyldisiloxane, 61.0 g of 1,3,5,7-tetramethylcyclotetrasiloxane, 103.8 g of octamethylcyclotetrasiloxane and 391.0 g of diphenyldimethoxysilane were fed to the flask, 25.0 g of concentrated sulfuric acid was added, and 29.4 g of water was added dropwise.

Synthesis Example-15

A silicone compound B-15 was obtained in the same manner as in Synthesis Example-1 except that 167.9 g of 1,1,3,3-tetramethyldisiloxane, 92.7 g of octamethylcyclotetrasiloxane, 49.6 g of octaphenylcyclotetrasiloxane and 297.4 g of phenyltrimethoxysilane were fed to the flask, 25.5 g of concentrated sulfuric acid was added, and 41.3 g of water was added dropwise.

Synthesis Example-16

A silicone compound B-16 was obtained in the same manner as in Synthesis Example-2 except that 403.2 g of water and 120 g of toluene were fed to the flask, and a mixture of 48.3 g of dimethylchlorosilane, 43.9 g of dimethyldichlorosilane, 21.5 g of diphenyldichlorosilane and 36.0 g of phenyltrichlorosilane was added dropwise.

Synthesis Example-17

A silicone compound B-17 was obtained in the same manner as in Synthesis Example-1 except that 70.5 g of 1,1,3,3-tetramethyldisiloxane, 126.3 g of 1,3,5,7-tetramethylcyclotetrasiloxane and 243.8 g of diphenyldimethoxysilane were fed to the flask, 25.0 g of concentrated sulfuric acid was added, and 18.3 g of water was added dropwise.

Synthesis Example-18

A silicone compound B-18 was obtained in the same manner as in Synthesis Example-1 except that 87.3 g of 1,1,3,3-tetramethyldisiloxane, 211.1 g of hexamethyldisiloxane, 31.3 g of 1,3,5,7-tetramethylcyclotetrasiloxane and 257.8 g of phenyltrimethoxysilane were fed to the flask, 25.0 g of concentrated sulfuric acid was added, and 35.8 g of water was added dropwise.

Synthesis Exmaple-19

A silicone compound B-19 was obtained in the same manner as in Synthesis Example-2 except that 447.2 g of water and 200 g of toluene were fed to the flask, and a mixture of 22.2 g of trimethylchlorosilane, 39.1 g of methyldichlorosilane, 21.9 g of dimethyldichlorosilane, 43.0 g of diphenyldichlorosilane, 12.7 g of methyltrichlorosilane and 18.0 g of phenyltrichlorosilane was added dropwise.

Synthesis Example-20

A silicone compound B-20 was obtained in the same manner as in Synthesis Example-1 except that 8.1 g of hexamethyldisiloxane, 120.3 g of 1,3,5,7-tetramethylcyclotetrasiloxane, 111.2 g of octamethylcyclotetrasiloxane and 195.5 g of diphenyldimethoxysilane were fed to the flask, 20.0 g of concentrated sulfuric acid was added, and 14.7 g of water was added dropwise.

B-13: silicone compound having an Si—H content of 0.21 mol/100 g, an aromatic group content of 49 wt % and an average polymerization degree of 8.0 prepared in Synthesis Example-13

B-14: silicone compound having an Si—H content of 0.20 mol/100 g, an aromatic group content of 50 wt % and an average polymerization degree of 42.0 prepared in Synthesis Example-14

B-15: silicone compound having an Si—H content of 0.50 mol/100 g, an aromatic group content of 31 wt % and an average polymerization degree of 11.0 prepared in Synthesis Example-15

B-16: silicone compound having an Si—H content of 0.52 mol/100 g, an aromatic group content of 27 wt % and an average polymerization degree of 6.5 prepared in Synthesis Example-16

B-17: silicone compound having an Si—H content of 0.80 mol/100 g, an aromatic group content of 39 wt % and an average polymerization degree of 7.9 prepared in Synthesis Example-17

B-18: silicone compound having an Si—H content of 0.37 mol/100 g, an aromatic group content of 20 wt % and an average polymerization degree of 4.4 prepared in Synthesis Example-18

B-19: silicone compound having an Si—H content of 0.34 mol/100 g, an aromatic group content of 33 wt % and an average polymerization degree of 62.0 prepared in Synthesis Example-19

B-20: silicone compound having an Si—H content of 0.50 mol/100 g, an aromatic group content of 31 wt % and an average polymerization degree of 88.0 prepared in Synthesis Example-20

Other components B

Synthesis Example-21

A silicone compound B-21 was obtained in the same manner as in Synthesis Example-1 except that 39.0 g of 1,1,3,3-tetramethyldisiloxane and 566.9 g of diphenyldimethoxysilane were fed to the flask, 25.0 g of concentrated sulfuric acid was added, and 42.6 g of water was added dropwise.

Synthesis Example-22

A silicone compound B-22 was obtained in the same manner as in Synthesis Example-2 except that 560.6 g of water and 130 g of toluene were fed to the flask, and a mixture of 21.2 g of trimethylchlorosilane, 52.3 g of methyldichlorosilane, 83.9 g of dimethyldichlorosilane and 13.8 g of phenyltrichlorosilane was added dropwise.

B-21 (comparison): silicone compound having an Si—H content of 0.12 mol/100 g, an aromatic group content of 72 wt % and an average polymerization degree of 10.0 prepared in Synthesis Example-21

B-22 (comparison): silicone compound having an Si—H content of 0.45 mol/100 g, an aromatic group content of 5 wt % and an average polymerization degree of 21.0 prepared in Synthesis Example-22

<Rational Formula of Each Silicone Compound>

B-13: $M_2D^H{}_2D_1D^{\Phi 2}{}_3$
B-14: $M_2D^H{}_{10}D_{14}D^{\Phi 2}{}_{16}$
B-15: $M^H{}_5D_{2.5}D^{\Phi 2}{}_{0.5}T^{\Phi}{}_3$
B-16: $M^H{}_3D_2D^{\Phi 2}{}_{0.5}T^{\Phi}{}_1$
B-17: $M^H{}_2D^H{}_4D^{\Phi 2}{}_{1.9}$
B-18: $M_2M^H{}_1D^H{}_{0.4}T^{\Phi}{}_1$
B-19: $M_{12}D^H{}_{20}D_{10}D^{\Phi 2}{}_{10}T_5T^{\Phi}{}_5$
B-20: $M_2D^H{}_{40}D_{30}D^{\Phi 2}{}_{16}$
B-21: $M^H{}_2D^{\Phi 2}{}_8$ (comparison)
B-22: $M_3D^H{}_7D_{10}T^{\Phi}{}_1$ (comparison)

The symbols in the above rational formulas represent the following respective siloxane units and the coefficient of each symbol represents the polymerization degree of a siloxane unit per one molecule.

M: $(CH_3)_3SiO_{1/2}$
$M^H$: $H(CH_3)_2SiO_{1/2}$
D: $(CH_3)_2SiO$
$D^H$: $H(CH_3)SiO$
$D^{\Phi 2}$: $(C_6H_5)_2SiO$
T: $(CH_3)SiO_{3/2}$
$T^{\Phi}$: $(C_6H_5)SiO_{3/2}$

TABLE 10

|  |  | Unit | Ex. 26 | Ex. 27 | Ex. 28 | Ex. 29 | Ex. 30 | Ex. 31 |
| --- | --- | --- | --- | --- | --- | --- | --- | --- |
| Components A | PC-1 | pbw | 100 |  |  | 100 | 100 | 100 |
|  | PC-2 | pbw |  | 100 | 100 |  |  |  |
| Components B | B-13 | pbw | 2 |  |  |  |  |  |
|  | B-14 | pbw |  | 2 | 5 |  |  |  |
|  | B-15 | pbw |  |  |  | 2 | 5 |  |
|  | B-16 | pbw |  |  |  |  |  | 2 |
| Time elapsed until dripping | After primary ignition | sec | no dripping | no dripping | no dripping | no dripping | no dripping | no dripping |
|  | After secondary ignition | sec | 7 | 18 | 22 | 9 | 18 | 7 |
| Transparency | Color | — | achromatic and transparent | achromatic and transparent | achromatic and transparent | achromatic and transparent | achromatic and transparent | achromatic and transparent |
|  | Haze | — | 0.3 | 1.6 | 9.1 | 1.1 | 1.3 | 0.8 |

TABLE 10-continued

|  |  | Unit | Ex. 26 | Ex. 27 | Ex. 28 | Ex. 29 | Ex. 30 | Ex. 31 |
|---|---|---|---|---|---|---|---|---|
| Resistance to moist heat | Color | — | achromatic and transparent | achromatic and transparent | achromatic and transparent | achromatic and transparent | achromatic and transparent | achromatic and transparent |
|  | Δhaze | — | 1.0 | 0.9 | 2.6 | 1.9 | 2.5 | 0.8 |
| Laser marking properties | Clarity | — | ○ | ○ | ○ | ○ | ○ | ○ |
|  | Current value | A | 19.2 | 19.4 | 18.6 | 19.6 | 18.5 | 19.7 |

Ex.: Example
pbw: part by weight

TABLE 11

|  |  | Unit | Ex. 32 | Ex. 33 | Ex. 34 | Ex. 35 |
|---|---|---|---|---|---|---|
| Component A | PC-1 | pbw | 100 | 100 | 100 | 100 |
| Components B | B-13 | pbw |  | 1 |  |  |
|  | B-15 | pbw | 2 | 1 | 2 | 2 |
| Components C | C-1 | pbw | 0.1 |  |  |  |
|  | C-2 | pbw |  | 0.1 | 0.1 |  |
|  | C-3 | pbw |  |  |  | 0.1 |
| Time elapsed until dripping | After primary ignition | sec | no dripping | no dripping | no dripping | no dripping |
|  | After secondary ignition | sec | no dripping | no dripping | no dripping | no dripping |
| Transparency | Color | — | achromatic and transparent | achromatic and transparent | achromatic and transparent | achromatic and transparent |
|  | Haze | — | 1.2 | 2.6 | 2.8 | 1.1 |
| Resistance to moist heat | Color | — | achromatic and transparent | achromatic and transparent | achromatic and transparent | achromatic and transparent |
|  | Δhaze | — | 2.0 | 1.6 | 1.6 | 4.1 |
| Laser marking properties | Clarity | — | ○ | ○ | ○ | ○ |
|  | Current value | A | 19.6 | 19.2 | 19.4 | 19.4 |

Ex.: Example
pbw: part by weight

TABLE 12

|  |  | Unit | C. Ex. 19 | C. Ex. 20 | C. Ex. 21 |
|---|---|---|---|---|---|
| Component A | PC-1 | pbw | 100 | 100 | 100 |
| Component B | B-15 | pbw | 0.05 | 20 |  |
| Other Component B | B-22 | pbw |  |  | 2 |
| Time elapsed until dripping | After primary ignition | sec | 1 | no dripping | no dripping |
|  | After secondary ignition | sec | 1 | 30 | 11 |
| Transparency | Color | — | achromatic and transparent | achromatic and transparent | cloudy |
|  | Haze | — | 0.4 | 7.9 | 77.7 |
| Resistance to moist heat | Color | — | achromatic and transparent | achromatic and transparent | cloudy |
|  | Δhaze | — | 0.3 | 11.3 | 1.8 |
| Laser marking properties | Clarity | — | X | X | X |
|  | Current value | A | 21.9 | 17.5 | 19.1 |

C. Ex.: Comparative Example
pbw: part by weight

TABLE 13

|  |  | Unit | C. Ex. 22 | C. Ex. 23 | C. Ex. 24 |
|---|---|---|---|---|---|
| Component A | PC-1 | pbw | 100 | 100 | 100 |
| Other Component B | B-11 | pbw |  | 10 |  |
|  | B-21 | pbw | 2 |  |  |
| Time elapsed until dripping | After primary ignition | sec | no dripping | 3 | 1 |
|  | After secondary ignition | sec | 13 | 1 | 1 |

TABLE 13-continued

|  |  | Unit | C. Ex. 22 | C. Ex. 23 | C. Ex. 24 |
|---|---|---|---|---|---|
| Transparency | Color | — | cloudy | achromatic and transparent | achromatic and transparent |
|  | Haze | — | 31.6 | 0.9 | 0.3 |
| Resistance to moist heat | Color | — | cloudy | achromatic and transparent | achromatic and transparent |
|  | Δhaze | — | 2.0 | 1.3 | 0.3 |
| Laser marking properties | Clarity | — | X | X | X |
|  | Current value | A | 19.1 | 21.6 | 22.2 |

C. Ex.: Comparative Example
pbw: part by weight

TABLE 14

|  |  | Unit | Ex. 36 | Ex. 37 | Ex. 38 |
|---|---|---|---|---|---|
| Component A | PC-1 | pbw | 100 | 100 | 100 |
| Components B | B-17 | pbw | 2 |  |  |
|  | B-18 | pbw |  | 2 |  |
|  | B-19 | pbw |  |  | 2 |
| Component C | C-2 | pbw | 0.1 | 0.1 | 0.1 |
| Time elapsed until dripping | After primary ignition | sec | no dripping | no dripping | no dripping |
|  | After secondary ignition | sec | no dripping | no dripping | no dripping |
| Transparency | Color | — | achromatic and transparent | achromatic and transparent | achromatic and transparent |
|  | Haze | — | 2.4 | 1.6 | 2.9 |
| Resistance to moist heat | Color | — | achromatic and transparent | achromatic and transparent | achromatic and transparent |
|  | Δhaze | — | 1.4 | 2.1 | 2.0 |
| Laser marking properties | Clarity | — | ○ | ○ | ○ |
|  | Current value | A | 18.7 | 19.1 | 19.1 |

Ex.: Example
pbw: part by weight

Examples 39 to 42

The amounts of components shown in Table 15 were weighed, 0.01 part by weight of a phosphite-based antioxidant (IRGAFOS168 of Nippon Ciba Geigy Co., Ltd.), 0.05 part by weight of a phenol-based antioxidant (IRGANOX 1076 of Ciba Specialty Chemicals), 0.3 part by weight of a release agent (Loxiol VPG861 of Cognis Japan Co., Ltd.) and 0.00005 part by weight of the Macrolex Violet B of Bayer AG were weighed, they were uniformly mixed together by a tumbler, and resin compositions were prepared and test samples were molded from the resulting mixtures in the same manner as in Example 1.

The used raw materials shown in Table 15 are given below.

Component D

D-1: talc (UPN HS-T0.8 of Hayashi Kasei Co., Ltd.)

TABLE 15

|  |  | Unit | Ex. 39 | Ex. 40 | Ex. 41 | Ex. 42 |
|---|---|---|---|---|---|---|
| Components A | PC-1 | pbw | 100 |  |  | 100 |
|  | PC-2 | pbw |  | 80 |  |  |
|  | PC-3 | pbw |  | 20 | 85 |  |
|  | PC-4 | pbw |  |  | 15 |  |
| Component B | B-13 | pbw | 1 | 1 | 1 | 1 |
| Components C | C-2 | pbw | 0.1 | 0.1 | 0.1 |  |
|  | C-3 | pbw |  |  |  | 0.05 |
| Component D | D-1 | pbw |  |  |  | 1 |
| Time elapsed until dripping | After primary ignition | sec | no dripping | no dripping | no dripping | no dripping |
|  | After secondary ignition | sec | no dripping | no dripping | no dripping | no dripping |
| Laser marking properties | Clarity | — | ○ | ○ | ○ | ○ |
|  | Current value | A | 19.1 | 19.2 | 19.2 | 19.2 |
| Transparency | Color | — | achromatic and transparent | achromatic and transparent | achromatic and transparent | achromatic and transparent |
|  | haze | — | 1.7 | 1.6 | 1.6 | 10.2 |

Ex.: Example
pbw: part by weight

Example 43

The amounts of components shown in Table 16 were weighed, 0.01 part by weight of a phosphite-based antioxidant (IRGAFOS168 of Nippon Ciba Geigy Ltd.), 0.05 part by weight of a phenol-based antioxidant (IRGANOX 1076 of Ciba Specialty Chemicals), 0.3 part by weight of a release agent (Loxiol VPG861 of Cognis Japan Ltd.), 2 parts by weight of a master pellet of a polycarbonate resin comprising a 2.5 wt % of polytetrafluoroethylene having fibril forming capability (97.5 wt % of the above PC-1 and 2.5 wt % of the POLYFLON MPA FA500 of Daikin Industries, Ltd. pelletized by the same twin-screw extruder as described above) and 0.00003 part by weight of the Macrolex Violet B of Bayer AG were weighed, they were uniformly mixed together by a tumbler, and a resin composition was prepared and a test sample were molded from the resulting mixture in the same manner as in Example 1.

Example 44

A 10 wt % methylene chloride solution was prepared by dissolving the above PC-1 and the above B-20 in methylene chloride in a weight ratio of 100:10. This methylene chloride solution was atomized by the GS-310 spray dryer for organic solvents of Yamato Lab-tech Co., Ltd. to obtain a mixed powder of a polycarbonate resin and an organic siloxane. This operation was carried out using nitrogen as a heating medium at an inlet temperature of the chamber of the heating medium of 70° C., a heating medium flow rate of 0.5 m³/min, an atomizing pressure of 100 kPa, a methylene chloride solution feed rate of 40 g/min and a chamber bottom temperature of 70° C.

The mixed powder and PC-1 were weighed to achieve the ratio shown in Table 16 and the same other components as in Example 39 not shown in the table were weighed to prepare a resin composition and mold a test sample in the same manner as in Example 39.

TABLE 16

| Component A | PC-1 | Unit | Ex. 43 | Ex. 44 |
|---|---|---|---|---|
| Component A | PC-1 | pbw | 100 | 100 |
| Components B | B-13 | pbw | 1 | |
| | B-20 | pbw | | 2 |
| Component C | C-2 | pbw | 0.1 | |
| Time elapsed until dripping | After primary ignition | sec | no dripping | no dripping |
| | After secondary ignition | sec | no dripping | no dripping |
| Laser marking properties | Clarity | — | ○ | ○ |
| | Current value | A | 19.2 | 19.7 |
| Transparency | Color | — | achromatic and transparent | achromatic and transparent |
| | haze | — | 5.4 | 12.2 |
| | Remarks | | addition of PTFE | use of premixed product of A and B |

Ex.: Example
pbw: part by weight

The following is understood from the above Examples. The flame retardant aromatic polycarbonate resin composition of the present invention is excellent in the clarity of a character or mark printed by laser marking as well as resin dripping preventing properties at the time of combustion because the time from after-ignition to dripping is prolonged by the addition of the silicone compound of the present invention.

The following is further understood. The transparent flame retardant aromatic polycarbonate resin composition of the present invention is excellent in transparency and resistance to moist heat as well as resin dripping preventing properties at the time of combustion because the time from after-ignition to dripping is prolonged by the addition of the silicone compound of the present invention. Especially when the polymerization degree of the silicone compound satisfies the above condition, excellent transparency and dripping preventing capability are achieved.

Example 45

After the pellet of Example 39 was dried by a hot air circulating dryer at 120° C. for 5 hours, it was extruded by a 40 mm-diameter single-screw extruder having a T die for sheets on the end portion thereof at a screw revolution of 40 rpm to extrusion mold a 100 µm-thick sheet using a one-side touching roll. The sheet had extremely excellent transparency and a smooth surface. The sheet was cut into a 50 mm square piece, and this sheet molded article was set in a DC magnetron sputtering device to form a 40 nm thick metal oxide layer made from indium oxide and tin oxide, a 9 nm thick silver-gold alloy layer and a 40 nm thick metal oxide layer made from the same oxides as above in the order named so as to produce a transparent conductive sheet.

What is claimed is:

1. A flame retardant aromatic polycarbonate resin composition comprising:
   (1) 100 parts by weight of resin components comprising 50 to 100 wt % of an aromatic polycarbonate resin (component A-1), 0 to 50 wt % of a styrene-based resin (component A-2) and 0 to 50 wt % of an aromatic polyester resin (component A-3); and
   (2) 0.1 to 10 parts by weight of a silicone compound (component B) which contains an Si—H group and an aromatic group in the molecule based on 100 parts by weight of the total of the resin components, wherein the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

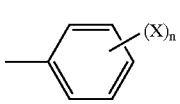
(1)

wherein X's are each independently an OH group or the residual monovalent organic group having 1 to 20 carbon atoms, and n is 0 or an integer of 1 to 5, with the proviso that when n is 2 or more, X's can differ from one another.

2. The flame retardant aromatic polycarbonate resin composition of claim 1, wherein the silicone compound (component B) has an average polymerization degree of 3 to 150.

3. The flame retardant aromatic polycarbonate resin composition of claim 1, wherein the silicone compound (component B) has an Si—H group content (Si—H content) of 0.2 to 1.0 mol/100 g.

4. The flame retardant aromatic polycarbonate resin composition of claim 1, wherein the silicone compound (component B) has an aromatic group content of 15 to 60 wt %.

5. The flame retardant aromatic polycarbonate resin composition of claim 1, wherein the silicone compound (component B) has a refractive index at 25° C. of 1.40 to 1.60.

6. The flame retardant aromatic polycarbonate resin composition of claim 1, wherein the silicone compound (component B) contains a constituent unit represented by at least one of the following general formulas (2) and (3):

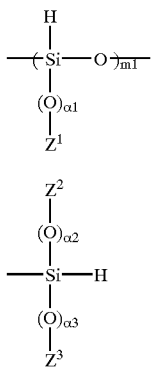

wherein $Z^1$ to $Z^3$ are each independently a hydrogen atom, the residual monovalent organic group having 1 to 20 carbon atoms or compound represented by the following general formula (4), α1 to α3 are each independently 0 or 1, and m1 is 0 or an integer of 1 or more, with the proviso that when m1 is 2 or more in the formula (2), the recurring units can differ from one another:

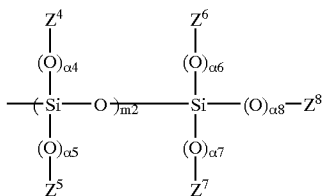

wherein $Z^4$ to $Z^8$ are each independently a hydrogen atom or the residual monovalent organic group having 1 to 20 carbon atoms, α4 to α8 are each independently 0 or 1, and m2 is 0 or an integer of 1 or more, with the proviso that when m2 is 2 or more in the formula (4), the recurring units can differ from one another.

7. The flame retardant aromatic polycarbonate resin composition of claim 1, wherein the silicone compound (component B) comprises an MD unit or MDT unit (M is a monofunctional siloxane unit, D is a difunctional siloxane unit and T is a trifunctional siloxane unit).

8. The flame retardant aromatic polycarbonate resin composition of claim 1 which further comprises 0.001 to 0.3 part by weight of at least one compound (component C) selected from a radical generator, organic alkali metal salt and organic alkali earth metal salt based on 100 parts by weight of the total of all the resin components (component A).

9. The flame retardant aromatic polycarbonate resin composition of claim 1 which further comprises 1 to 100 parts by weight of a filler (component D) based on 100 parts by weight of the total of all the resin components (component A).

10. The flame retardant aromatic polycarbonate resin composition of claim 1, wherein the resin components (component A) consist of 50 to 99.5 wt % of an aromatic polycarbonate resin (component A-1), 0 to 50 wt % of a styrene-based resin (component A-2) and/or 0 to 50 wt % of an aromatic polyester resin (component A-3), and the total amount of the components A-2 and A-3 is 0.5 to 50 wt %.

11. The flame retardant aromatic polycarbonate resin composition of claim 1 which comprises substantially no halogen compound as a flame retardant.

12. A transparent flame retardant aromatic polycarbonate resin composition comprising 100 parts by weight of an aromatic polycarbonate resin (component A-1) and 0.1 to 10 parts by weight of a silicone compound (component B) which contains an Si—H group and an aromatic group in the molecule, wherein
the silicone compound is at least one selected from silicone compounds which have (1) an Si—H group content (Si—H content) of 0.1 to 1.2 mols/100 g and (2) a content of an aromatic group represented by the following general formula (1) (aromatic group content) of 10 to 70 wt %:

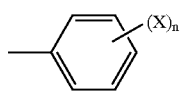

wherein X's are each independently an OH group or the residual monovalent organic group having 1 to 20 carbon atoms, and n is 0 or an integer of 1 to 5, with the proviso that when n is 2 or more, X's can differ from one another.

13. The transparent flame retardant aromatic polycarbonate resin composition of claim 12, wherein the silicone compound (component B) has an average polymerization degree of 3 to 80.

14. The transparent flame retardant aromatic polycarbonate resin composition of claim 12, wherein the silicone compound (component B) has an Si—H group content (Si—H content) of 0.2 to 1.0 mol/100 g.

15. The transparent flame retardant aromatic polycarbonate resin composition of claim 12, wherein the silicone compound (component B) has an aromatic group content of 15 to 60 wt %.

16. The transparent flame retardant aromatic polycarbonate resin composition of claim 12, wherein the silicone compound (component B) has an average polymerization degree of 3 to 60.

17. The transparent flame retardant aromatic polycarbonate resin composition of claim 12, wherein the silicone compound (component B) has a refractive index at 25° C. of 1.40 to 1.60.

18. The transparent flame retardant aromatic polycarbonate resin composition of claim 12, wherein the silicone compound (component B) contains a constituent unit represented by at least one of the following general formulas (2) and (3):

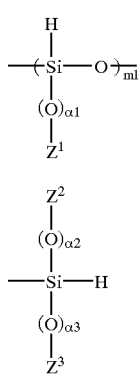

wherein $Z^1$ to $Z^3$ are each independently a hydrogen atom, the residual monovalent organic group having 1 to 20 carbon atoms or compound represented by the following general formula (4), α1 to α3 are each independently 0 or 1, and m1 is 0 or an integer of 1 or more, with the proviso that when m1 is 2 or more in the formula (2), the recurring units can differ from one another:

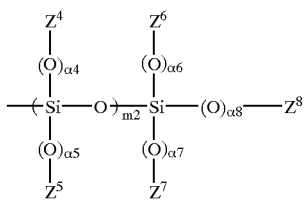

(4)

wherein $Z^4$ to $Z^8$ are each independently a hydrogen atom or the residual monovalent organic group having 1 to 20 carbon atoms, α4 to α8 are each independently 0 or 1, and m2 is 0 or an integer of 1 or more, with the proviso that when m2 is 2 or more in the formula (4), the recurring units can differ from one another.

19. The transparent flame retardant aromatic polycarbonate resin composition of claim 12, wherein the silicone compound (component B) comprises an MD unit or MDT unit (M is a monofunctional siloxane unit, D is a difunctional siloxane unit and T is a trifunctional siloxane unit).

20. The transparent flame retardant aromatic polycarbonate resin composition of claim 12, wherein the haze value measured in accordance with JIS K7105 of a 2 mm-thick molded article thereof is 0.3 to 20%.

21. The transparent flame retardant aromatic polycarbonate resin composition of claim 12, wherein the difference (ΔH) between the initial haze measured in accordance with JIS K7105 of a 2 mm-thick molded article thereof and the haze, after it is left at a temperature of 65° C. and a humidity of 85% for 300 hours, is 0.01 to 10%.

22. The transparent flame retardant aromatic polycarbonate resin composition of claim 12 which further comprises 0.001 to 0.3 part by weight of at least one compound (C) selected from a radical generator, organic alkali metal salt and organic alkali earth metal salt based on 100 parts by weight of the aromatic polycarbonate resin (A).

23. The transparent flame retardant aromatic polycarbonate resin composition of claim 12 which comprises substantially no halogen compound as a flame retardant.

24. A molded article formed from the aromatic polycarbonate resin composition of claim 1.

25. A transparent sheet formed from the aromatic polycarbonate resin composition of claim 12.

26. A molded article formed from the aromatic polycarbonate resin composition of claim 12.

* * * * *

UNITED STATES PATENT AND TRADEMARK OFFICE
CERTIFICATE OF CORRECTION

PATENT NO. : 6,727,303 B2 Page 1 of 1
APPLICATION NO. : 10/229221
DATED : April 27, 2004
INVENTOR(S) : Tetsushi Ono et al.

It is certified that error appears in the above-identified patent and that said Letters Patent is hereby corrected as shown below:

On the front page of the patent, item (73), please change:

"Teijin Chemicals, Ltd. (Tokyo, JP)" to --Teijin Chemicals, Ltd. (Tokyo, JP) and Shin-Etsu Chemical Company, Ltd. (Tokyo, JP)--.

Signed and Sealed this

Fifth Day of September, 2006

JON W. DUDAS
*Director of the United States Patent and Trademark Office*